(12) United States Patent
Tan et al.

(10) Patent No.: US 7,901,093 B2
(45) Date of Patent: Mar. 8, 2011

(54) MODELING LIGHT TRANSPORT IN COMPLEX DISPLAY SYSTEMS

(75) Inventors: Kar-Han Tan, Palo Alto, CA (US); Jing Xiao, Sunnyvale, CA (US); Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 1091 days.

(21) Appl. No.: 11/623,016

(22) Filed: Jan. 12, 2007

(65) Prior Publication Data

US 2007/0171382 A1 Jul. 26, 2007

Related U.S. Application Data

(63) Continuation-in-part of application No. 11/613,129, filed on Dec. 19, 2006, now Pat. No. 7,794,090.

(60) Provisional application No. 60/762,178, filed on Jan. 24, 2006.

(51) Int. Cl.
*G03B 21/14* (2006.01)
(52) U.S. Cl. .......................................... 353/121; 382/276
(58) Field of Classification Search .................... 353/69, 353/70, 94, 121, 122; 348/333.1, 745; 382/165, 382/295; 345/1.3, 125, 589
See application file for complete search history.

(56) References Cited

U.S. PATENT DOCUMENTS

| | | | |
|---|---|---|---|
| 6,527,395 B1 * | 3/2003 | Raskar et al. ................... 353/70 |
| 6,549,203 B2 | 4/2003 | Randel | |
| 6,618,076 B1 * | 9/2003 | Sukthankar et al. .......... 348/180 |
| 6,628,892 B2 | 9/2003 | Tsumagari et al. | |
| 7,218,324 B2 * | 5/2007 | Pfister et al. ................... 345/426 |
| 2004/0119729 A1 | 6/2004 | Covannon et al. | |
| 2005/0285860 A1 * | 12/2005 | Pfister et al. ................... 345/426 |
| 2007/0171381 A1 * | 7/2007 | Tan et al. ......................... 353/69 |
| 2007/0171382 A1 * | 7/2007 | Tan et al. ......................... 353/69 |
| 2008/0174516 A1 * | 7/2008 | Xiao et al. ...................... 345/1.3 |
| 2008/0174704 A1 * | 7/2008 | Tan et al. ........................ 348/745 |
| 2009/0073324 A1 * | 3/2009 | Tan et al. ........................ 348/745 |
| 2009/0086081 A1 * | 4/2009 | Tan et al. .................... 348/333.1 |
| 2009/0091615 A1 * | 4/2009 | Tan et al. ........................ 348/125 |
| 2010/0085425 A1 * | 4/2010 | Tan ................................... 348/54 |
| 2010/0123784 A1 * | 5/2010 | Ding et al. ...................... 348/189 |
| 2010/0141780 A1 * | 6/2010 | Tan et al. ..................... 348/222.1 |

OTHER PUBLICATIONS

Kar-Han Tan and Anoop K. Bhattacharjya, "Adaptive Light Projection System for Immersive Surround Video", May 24, 2005, Version 0.1, Palo Alto Laboratory, Epson R&D, Inc., Palo Alto, CA, USA, pp. 1-8.

(Continued)

*Primary Examiner* — William C Dowling

(57) ABSTRACT

An image created by a first projector is recreated using a second projector by relating the two projectors to a common point of view, preferably as viewed from a camera. A first transport matrix $T_1$ is captured to relate the first projector to the camera. A second transport matrix $T_2$ is then capture to relate the second projector to the camera. To have a first image $p_1$, as projected by the first projector, reproduced by the second projector, the second projector projects a distorted image defined as $(T_2^{-1})(T_1)p_1$. The inverse of $T_2$, as used in this equation is an estimation defined by first creating an intermediate matrix $\check{T}$ of equal size as $T_2$. If a column in $T_2$ is denoted as Tr and a corresponding column in $\check{T}$ is denoted as $\check{T}r$, then the construction and population of $\check{T}$ is defined as $\check{T}r=Tr/(\|Tr\|)^2$, and the inverse of $T_2$ is estimated as the transpose of $\check{T}$.

13 Claims, 18 Drawing Sheets

OTHER PUBLICATIONS

Kar-Han Tan, Jing Xiao, and Anoop K. Bhattacharjya, "Efficient Dual Photography", Dec. 14, 2005, Version 0.1, Palo Alto Laboratory, Epson R&D, Inc. Palo Alto, CA, USA, pp. 1-7.

Pradeep Sen et al., "Dual Photography", ACM SIGGRAPH 2005 conference proceedings, pp. 1-11.

Steven M. Seitz, et al. "A Theory of Inverse Light Transport", pp. 1-8.

* cited by examiner

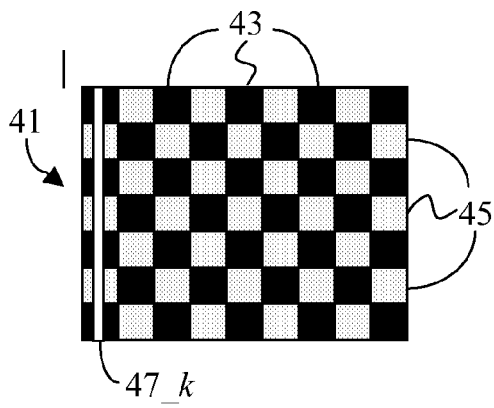
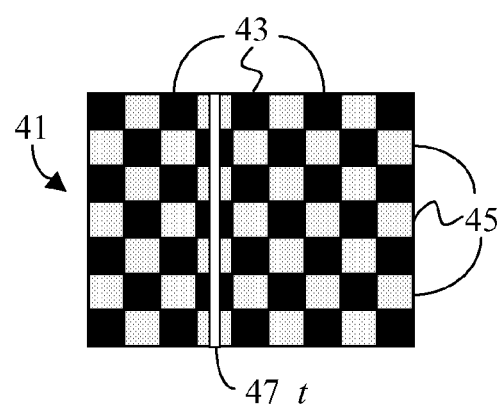
Fig. 4A  Fig. 4B
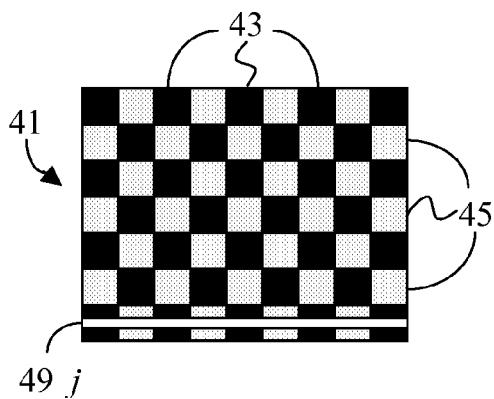
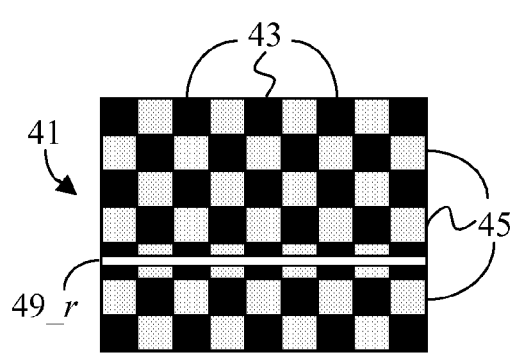
Fig. 5A  Fig. 5B
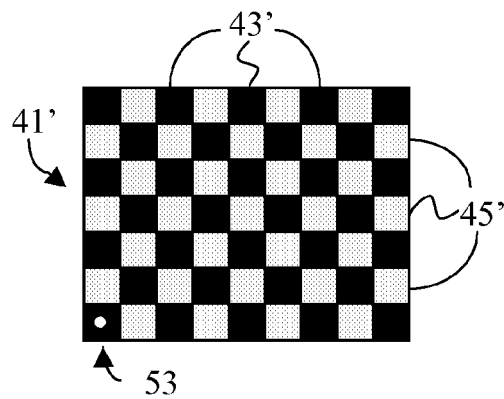
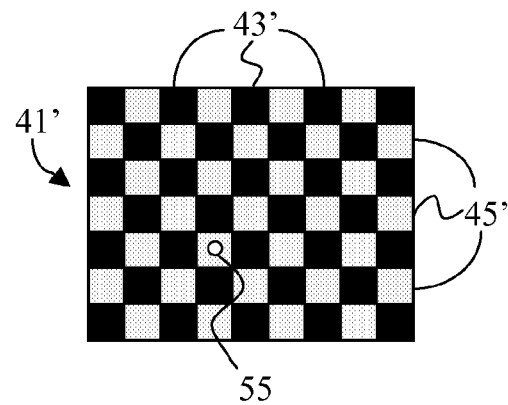
Fig. 6A  Fig. 6B

MODELING LIGHT TRANSPORT IN COMPLEX DISPLAY SYSTEMS

CONTINUING APPLICATION DATA

This application claims the benefit of U.S. Provisional Application No. 60/762,178 filed Jan. 24, 2006 under 35 U.S.C. §119(e), and claims the benefit under Title 35, U.S.C. §120 of application Ser. No. 11/613,129, filed Dec. 19, 2006, pending.

BACKGROUND OF THE INVENTION

1. Field of the Invention

The present invention is related to methods of calibrating projectors in projector-camera systems, and more specifically related to methods of simplifying application of dual photography.

2. Description of the Related Art

When projectors and cameras are combined, hybrid devices and systems that are capable of both projecting and capturing light are born. This emerging class of imaging devices and systems are known in the research community as projector-camera systems. Typically, the images captured by one or more cameras, is used to estimate attributes about the display environment, such as the geometric shape of the projection surfaces. The projectors in the system then adapt the images projected so as to improve the resulting imagery.

A key problem that builders of projector-camera systems and devices need to solve is the determination of the internal imaging parameters of each device (the intrinsic parameters) and the determination of the geometric relationship between all projectors and cameras in the system (the extrinsic parameters). This problem is commonly referred to as that of calibrating the system.

In the computer vision community, there is a large body of work for calibrating imaging systems with one or more cameras. A commonly used method in the computer vision community for calibrating cameras is described in article, "A flexible new technique for camera calibration", IEEE Transactions on Pattern Analysis and Machine Intelligence, 22(11): 1330-1334, 2000, by Zhengyou Zhang, which is herein incorporated in its entirety by reference. In this method, multiple images of a flat object marked with a number of known feature points (typically forming a grid) are captured by a camera, with the flat object posed at a variety of angles relative to the camera. The image location of each feature point is extracted, and since the relative location of each feature point is known, the collection of feature point locations can then be used to calibrate the camera. When two or more cameras are present in the system, the intrinsic parameters as well as the geometric relationship between all cameras can be estimated by having all cameras capture an image of the flat object at each pose angle.

Since projectors and cameras are very similar in terms of imaging geometry, it might seem reasonable that techniques for calibrating cameras may be applicable to the calibration of projectors, and projector-camera systems. However, since all camera calibration techniques require that the camera (i.e. the imaging device being calibrated) capture a number of images, it would appear that camera calibration techniques cannot readily be applied to projectors, which cannot capture images.

Therefore, in traditional systems the cameras are calibrated first, and then the calibrated cameras are used to calibrate the projector. In these systems, a "bootstrapping" procedure, in which a pair of calibrated cameras are used to form a stereo pair, is used. As it is known, a stereo pair of cameras can be used to estimate depth, i.e. a perspective view, of feature points visible to the stereo pair. To calibrate a projector, the projector is first made to project feature points onto a display environment (i.e. a projection surface), and then by using the stereo pair of calibrated cameras to determine the perspective depth location of the projected points, the projector can be calibrated accordingly to compensate for surface irregularities in the display environment.

While this bootstrapping technique is a tested-and-proven calibration method for projector-camera systems, it is not applicable to the calibration of self-contained projector-camera devices, since it requires the use of external stereo camera pairs.

A technique called dual photography was proposed by Sen et al. in article, "Dual Photography", Proceedings ACM SIGGRRAPH, 2005, which is herein incorporated by reference in its entirety. Dual photography makes use of Helmholtz reciprocity to use images captured with real cameras to synthesize pseudo images (i.e. dual images) that simulate images "as seen" (or effectively "captured") by projectors. That is, the pseudo image simulates a captured image as "viewed" by the projector, and thus represents what a projector-captured image would be if a projector could capture images. This approach would permit a projector to be treated as a pseudo camera, and thus might eliminate some of the difficulties associated with calibrating projectors.

Helmholtz reciprocity is based on the idea that the flow of light can be effectively reversed without altering its transport properties. Helmholtz reciprocity has been used in many computer graphics applications to reduce computational complexity. In computer graphics literature, this reciprocity is typically summarized by an equation describing the symmetry of the radiance transfer between incoming and outgoing directions, $\omega_i$ and $\omega_o$: $fr(\omega_i \to \omega_o) = fr(\omega_o \to \omega_i)$, where fr represents the bidirectional reflectance distribution function, BRDF, of a surface.

Thus, dual photography ideally takes advantage of the dual nature (i.e. duality relationship) of a projected image and a captured image to simulate one from the other. As is described in more detail below, dual photography (and more precisely Helmholtz reciprocity) requires the capturing of the light transport between a camera and a projector.

When dealing with a digital camera and a digital projector, dual photography requires capturing each light transport coefficient between every camera pixel and every projector pixel, at the resolution of both devices. Since a digital projector and a digital camera can both have millions of pixels each, the acquisition, storage, and manipulation of multitudes of light transport coefficients can place real practical limitations on its use. Thus, although in theory dual photography would appear to offer great benefits, in practice, dual photography is severely limited by its physical and impractical requirements of needing extremely large amounts of computer memory (both archive disk-type memory and active silicon memory) and needing extensive and fast computational processing.

A clearer understanding of dual photography may be obtained with reference to FIGS. 1A and 1B. In FIG. 1A, a "primal configuration" (i.e. a configuration of real, physical devices prior to any duality transformations) includes a real digital projector 11, a real projected image 13, and a real digital camera 15. Light is emitted from real projector 11 and captured by real camera 15. A coefficient relating each projected beam of light (from real projector 11) to a correspondingly captured beam of light (at real camera 15) is called the light transport coefficient. Using the light transport coefficient, it is possible to determine the characteristics of a projected beam of light from a captured beam of light.

In the present example, real projector 11 is a digital projector having an array of projector pixels 17 symbolically shown in a dotted box and comprised of s rows and r columns of projector pixels e. The size of projector pixel array 17 depends on the resolution of real projector 11. For example, an VGA resolution may consists of 640 by 480 pixels (i.e. 307,200 projector pixels e), an SVGA resolution may have 800 by 600 pixels (i.e. 480,000 projector pixels e), an XVG resolution may have 1024 by 768 pixels (i.e. 786,732 projector pixels e), an SXVG resolution may have 1280 by 1024 (i.e. 1,310,720 projector pixels e), and so on, with greater resolution projectors requiring a greater number of projector pixels e.

Similarly, real camera 15 is a digital camera having an array of light receptor pixels 19 symbolic shown in a dotted box and comprised of u rows and v columns of receptor pixels g. The size of receptor pixel array 19 again depends on the resolution of real camera 15. However, it is common for real camera 15 to have a resolution of 4 MegaPixels (i.e. 4,194,304 receptor pixels g), or greater.

Since real projector 11 is a digital projector having an array of individual light projection pixels e and real camera 15 is a digital camera having an array of individual light receptor pixels g, a matrix T is used to describe the group of light transport coefficients relating each projector pixel e in real projector 11 to each receptor pixel g of real camera 15 (i.e. element $T_{ge}$ in matrix T would be the transport coefficient from an individual, real projector pixel e to an individual, real camera receptor pixel g). Therefore, a real captured image C' is related to a projected image P' as C'=TP'.

The duality transformation, i.e. dual configuration, of the system of FIG. 1A is shown FIG. 1B. In this dual configuration, real projector 11 of FIG. 1A is transformed into a virtual camera 11", and real camera 15 of FIG. 1A is transformed into a virtual projector 15". It is to be understood that virtual camera 11" and virtual projector 15" represent the dual counterparts of real projector 11 and real camera 15, respectively, and are not real devices themselves. That is, virtual camera 11" is a mathematical representation of how a hypothetical camera (i.e. virtual camera 11") would behave to capture a hypothetically projected image 13", which is similar to real image 13 projected by real projector 11 of FIG. 1A. Similarly, virtual projector 15" is a mathematical representation of how a hypothetical projector (i.e. virtual projector 15") would behave to project hypothetical image 13" that substantially matches real image 13, as captured by real camera 15 (of FIG. 1A). Thus, the positions of the real projector 11 and real camera 15 of FIG. 1A are interchanged in FIG. 1B as virtual camera 11" and virtual projector 15". However, the pixel resolution of the real devices carries forward to their counterpart, dual devices. Therefore, virtual camera 11" has a virtual receptor pixel array 17" consisting of s rows and r columns to match projector pixel array 17 of real projector 11. Similarly, virtual projector 15" has a virtual projection pixel array 19" consisting of u rows and v columns to match receptor pixel array 19 to real camera 15.

Suppose a dual transport matrix T" is the transport matrix in this dual configuration such that a virtual captured image C" (as captured by virtual camera 11") is related to a virtual projected image P" (as projected by virtual projector 15") as C"=TP", then $T''_{eg}$ would be the dual light transport coefficient between virtual projector pixel g" and virtual receptor pixel e".

Helmholtz reciprocity specifies that the pixel-to-pixel transport is equal in both directions (i.e. from real projector 11 to real camera 15, and from virtual projector 15" to virtual camera 11"). That is, $T''_{eg}=T_{ge}$, which means $T''=T^T$, (i.e. dual matrix T" is equivalent to the result of the mathematical transpose operation on real matrix T). Thus, given matrix T, one can use $T^T$ to synthesize the images that would be acquired in the dual configuration.

OBJECTS OF THE INVENTION

It is an object of the present invention to simplify the application of dual photography.

It is another object of the present invention to simplify the use of dual photography in the calibration of a real projector in projector-camera systems.

It is a further object of the present invention to make use of the benefits of dual photography in the calibration of a real projector while avoiding the need of some of the more time consuming and complicated requirements of dual photography.

SUMMARY OF THE INVENTION

The above objects are met in a system that simplifies the generation of dual transport matrix T, simplifies the implementation of light transport coefficients in dual photography, and combines the ease of dual photography manipulation with the reduced calculation requirement of nomography.

Application of dual photography is simplified by reducing the number of captured images needed to generate a light transport matrix T of (p×q) projection pixel array from (p×q) images to (p+q) images. Manipulation of the light transport matrix is simplified by replacing the use of a matrix T with an index associating each projection pixel to only non-zero light transport values. By eliminating the use of zero-valued light transport coefficients, the memory and processing requirements for implementing dual photography are greatly reduced. This dual photography technique is applied to the calibration of projector-camera systems.

A second method for calibrating projector-camera systems uses a known projection test pattern and a calibrated camera to associate projected spatial markers on a real image to a captured image. Since the real location of the projected spatial markers are determined by the calibrated camera, and the relative location of the spatial markers on the test pattern is also known (since it was projected by the projector to be calibrated), the projector may be calibrated using homography techniques to assure that its known relation between projected spatial markers agrees with the true location of the spatial markers on the projection scene, as determined by the calibrated camera.

In a first embodiment of the present invention, a method of generating light transport coefficients relating a digital projector to a digital camera is shown. In the case where digital projector has an array of projection pixels and the digital camera has an array of sensor pixel, the method includes: simultaneously activating a first group of projection pixels within the projector to project a first test pattern on a projection scene, any projection pixels not in said first test pattern being maintained dark; capturing a first image of the first test pattern on the projection scene; simultaneously activating a second group of projection pixels within the projector to project a second test pattern on the projection scene, any remaining projection pixels not in the second test pattern being maintained dark, wherein the first and second groups of projection pixels have only one projection pixel in common defining a target projection pixel; capturing a second image of said second test pattern on said projection scene; comparing image pixels of the first image to corresponding image pixels of the second image and retaining the darker of two compared image pixels, the retained image pixels constituting a composite image; and identifying all none-dark image pixels in the composite image, the none-dark image pixels defining non-zero light transport coefficients associated with the target projection pixel.

Following this method, it may be further clarified that the first test pattern and the second test pattern form a first pattern pair associated with the target projection pixel; each projection pixel within the digital projector has an associated unique pattern pair comprised of a respective first test pattern and respective second test pattern; and the light transport coefficients of any selected projection pixel within the digital projector is obtained by comparing captured images of the selected projection pixel's respective first test pattern and respective second pattern comprising its associated unique pattern pair; wherein the comparing of the unique pattern pair includes: comparing image pixels of the respective first image to corresponding image pixels of said respective second image and retaining the darker of two compared image pixels, the retained image pixels constituting a respective composite image; identifying all none-dark image pixels in the respective composite image, the none-dark image pixels defining the light transport coefficients associated with any selected projection pixel.

Further in this method, the projector preferably has an array of rows and columns of projection pixels; the respective first test pattern is comprised of the simultaneous activating of all projection pixels within one column of the array; and the respective second test pattern is comprised of the simultaneous activating of all projection pixels within one row of the array.

Alternatively, the method of generating light transport coefficients may further include identifying the light transport coefficients for a selected number of the target projection pixels; generating an index associating each of the selected number of target projection pixels to their correspondingly associated non-zero light transport coefficients; and storing only the non-zero light transport coefficients.

In still an alternate embodiment, the light transport coefficients relating the digital projector to the digital camera are suitable for use in dual photography.

The present invention may be applied to the calibrating a projector-camera system having at least one digital projector and one digital camera, wherein the method includes: identifying a projection scene; calibrating the camera to the projection scene; identifying non-zero light transport coefficients associating each projection pixel within the digital projector to the digital camera; creating an index associating each projection pixel to its corresponding non-zero light transport coefficients, and disregarding each zero light transport coefficients of each projection pixel; using non-zero light transport coefficients, as identified by the index, to generate a dual image of the projection scene from the point of view of the projector using a dual photography technique; and applying a camera calibration technique to the projector by treating said projector as a virtual camera and using the dual image as a test image for calibrating said projector.

Further in this method, the step of identifying non-zero light transport coefficient associating each projection pixel within the digital projector to the digital camera, may include: identifying a first set of first test patterns, each first test pattern including of a plurality of projection pixels; identifying a second set of second test patterns, each second test pattern including a plurality of projection pixels, wherein each projection pixel within the projector is uniquely identified by an intersection of a test pattern pair consisting of a corresponding first test pattern from said first set and a corresponding second test pattern from said second set; activating each of the first test patterns within the first set onto the projection scene, and capturing an image of the resultant projected image; activating each of the second test patterns within the second set onto the projection scene, and capturing an image of the resultant projected image; and for each projection pixel within the projector, comparing image pixels of the captured image of its corresponding projected first test pattern to corresponding image pixels of the captured image of its corresponding projected second test pattern, retaining the darker of the two compared image pixels, the retained image pixels constituting a composite image, and identifying all none-dark image pixels in said composite image, the none-dark image pixels defining non-zero light transport coefficients.

In an alternate embodiment, a method for calibrating a projector-camera system having at least one digital projector and one digital camera, includes: identifying a projection scene; calibrating the camera to the projection scene; projecting a known test pattern unto the projection scene, the known test pattern including a group of spatial markers with a known spatial relation to each other; using homography techniques to identify the relationship between the camera and the projection scene to identifying the real locations of said spatial markers on the projection scene; using nomography techniques to relate the real locations of the spatial markers on the projection scene as determined using said camera, to the known spatial relation of the spatial markers on the known test pattern, calibrate the projector so as make the known spatial relation of the known test pattern match the real locations of said spatial markers on said projection scene.

Continuing in this method, the known test pattern may include not less than four spatial markers.

Also, the known spatial relation between the spatial markers is preferably limited to a two-dimensional projection.

Further in the present invention, an image created by a first projector is recreated using a second projector by relating the two projectors to a common point of view, preferably as viewed from a camera. A first transport matrix $T_1$ is captured to relate the first projector to the camera. A second transport matrix $T_2$ is then capture to relate the second projector to the camera. To have a first image $p_1$, as projected by the first projector, reproduced by the second projector, the second projector projects a distorted image defined as $(T_2^{-1})(T_1)p_1$.

If the first projector is front projector and the second projector is an immersive projector, then the immersive projector can be used to recreate a front projected image from the point of view of an audience without worrying about the audience blocking the projection path of a front projector.

In the calculation, $(T_2^{-1})(T_1)p_1$, the inverse of $T_2$ is an estimation defined by first creating an intermediate matrix $\check{T}$ of equal size as $T_2$. If a column in $T_2$ is denoted as Tr and a corresponding column in $\check{T}$ is denoted as $\check{T}r$, then the construction and population of $\check{T}$ is defined as $\check{T}r=Tr/(\|Tr\|)^2$, and the inverse of $T_2$ is estimated as the transpose of $\check{T}$.

The present approach may also be used to recreate real images, or lighting effects, first created in a computer model. In this case, a transport matrix relating a projector and a camera, which defines a preferred viewing position, is created. A model, such as a computer model of the projector, camera, and a projection surface is then created. Within the model, a model image or model lighting effect is created, and a virtual image as taken by the model camera is then generated. The virtual image is then generated using the real projector and real camera using the created transport matrix.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 3A is an illustrative example of a projected footprint on a light sensor array within a digital camera resulting from activation of a single projection pixel in a projector.

FIG. 3B is an illustrative example of a column of light transfer coefficients within a matrix T reflecting the example of FIG. 3A.

FIGS. 4A and 4B show two examples of two columns of projection pixels simultaneously projected onto a scene having a checker board pattern.

FIGS. 5A and 5B show two examples of two rows of projection pixels simultaneously projected onto a scene having a checker board pattern.

FIG. 6A shows a generated light beam footprint resultant from a single projection pixel, as created by combining the images of FIGS. 4A and 5A.

FIG. 6B shows a generated light beam footprint resultant from a single projection pixel, as created by combining the images of FIGS. 4B and 5B.

DESCRIPTION OF THE PREFERRED EMBODIMENTS

If projectors could capture images, then there would be no need to differentiate between real projectors and real cameras, and projector-camera systems could be treated like multi-camera systems. Subsequently, the standard camera calibration techniques described above could be used to calibrate projector-camera systems. In other words, if the projector could be treated as a pseudo-camera, then it could be calibrated along with a real camera in a manner similar to the camera calibration stage of the multi-camera system described above, and the "bootstrapping" projector calibration stage might be eliminated.

Consequently, whereas in the "bootstrapping" projection calibration technique, a projector would project known feature points to be captured by a stereo pair of pre-calibrated cameras onto a known projection surface to determine the contours of the projection surface, a dual photography technique could eliminates the need for the stereo pair pre-calibrated cameras.

Figure 2A:
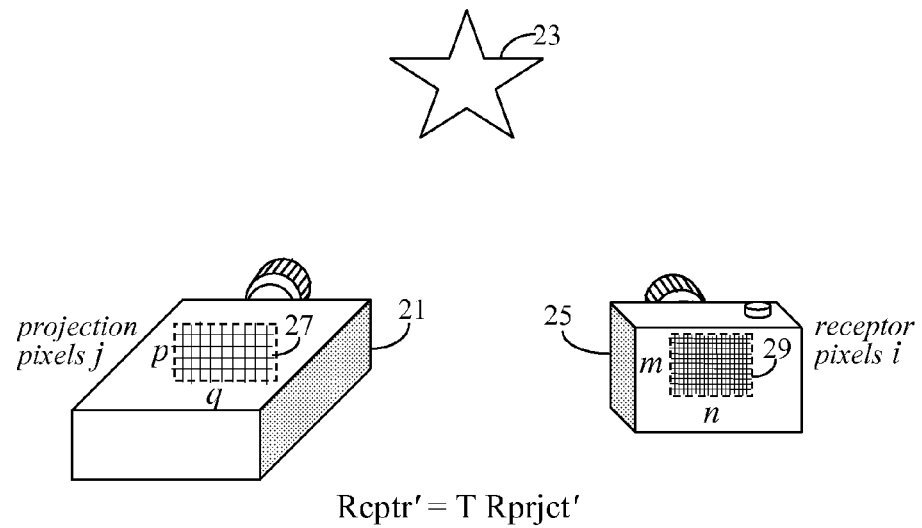
FIGS. 2A and 2B show a setup for dual photography in accord with the present invention.

With reference to FIG. 2A, an imaging setup in accord with the present invention may include a real projector 21 and a real camera 25. Real projector 21 is preferably a digital projector and has an imaging element including an imaging projection array 27, consisting of p rows and q columns of individual imaging projection elements (i.e. projection pixels) j. Imaging projection array 27 is internal to real projector 21, and is shown in thin lines in a dotted box in FIG. 2A. Real projector 21 is preferably of the liquid crystal display (LCD) type, Digital Light Processing (DLP) type, liquid crystal on silicon (LCOS) type, or other digital projection technology type.

Preferably, real camera 25 is a digital camera having an image sensor including an image sensor array 29, consisting of m rows by n columns of individual image sensor elements (i.e. sensor pixels) i. For simplicity, image sensor array 29 is shown on real camera 25, but it is to be understood that image sensor array 29 is internal to real camera 25.

This physical setup using a real projector 21 and real camera 25 is preferably called the 'primal' setup. Light rays emitted from real projector 21 bounce off a projection surface (i.e. display environment or scene) 23, which may have an irregular or flat shape, and some of the light rays eventually reach the image sensor within real camera 25. In general, each ray of light is dispersed, reflected, and refracted in the scene and hits the camera's image sensor at a number of different locations throughout image sensor array 29. Thus, when a light ray emitted from an imaging projection pixel j in real projector 21 reaches real camera 25, the projected light ray forms an m-by-n image on the camera's image sensor array 29, with each individual sensor pixel i within image sensor array 29 receiving a certain amount of light. Consequently, each light ray emitted from each individual projection pixel j of real projector 21 generates (m×n) [i.e. m-multiplied-by-n] individual light transport coefficients, one for each sensor pixel i within real camera 25. Consequently, the entire light transport matrix T will consist of (p×q) [i.e. p multiplied-by q] columns (one for each individual projection pixel j within real projector 21) and (m×n) rows (one for each individual image sensor pixel i within real camera 25).

If a full, real image (i.e. an image projected using the entire imaging projection array 27 of real projector 21) is represented as a "p by q vector" [i.e. an (p×q) vector], Rprjct', and the corresponding full, real image captured by the image sensor array 29 of real camera 25 is represented as an "m by n vector" [i.e. an (m×n) vector], Rcptr', then the light transport between real projector 21 and real camera 25 can be written as Rcptr'=T Rprjct' where T is called the light transport matrix. It is to be understood that since each projection pixel j results in a light ray that is scattered across the entire image sensor array 29 of real camera 25, each sensor pixel i within the image sensor array 29 will have a differently valued light transport coefficient for each projection pixel j. Therefore, each projection pixel j will result in a column of (m×n) individual light transport coefficients, one for each sensor pixel i of the camera's image sensor array 29. Since there are (p×q) projection pixels j in real projector 21, light transport matrix T will have (p×q) columns [one for each projection pixel j] and (m×n) rows [one for each sensor pixel i] of individual light transport coefficients. Thus, light transport matrix T will necessarily be huge, consisting of (p×q×m×n) individual light transport coefficient values.

Figure 2B:
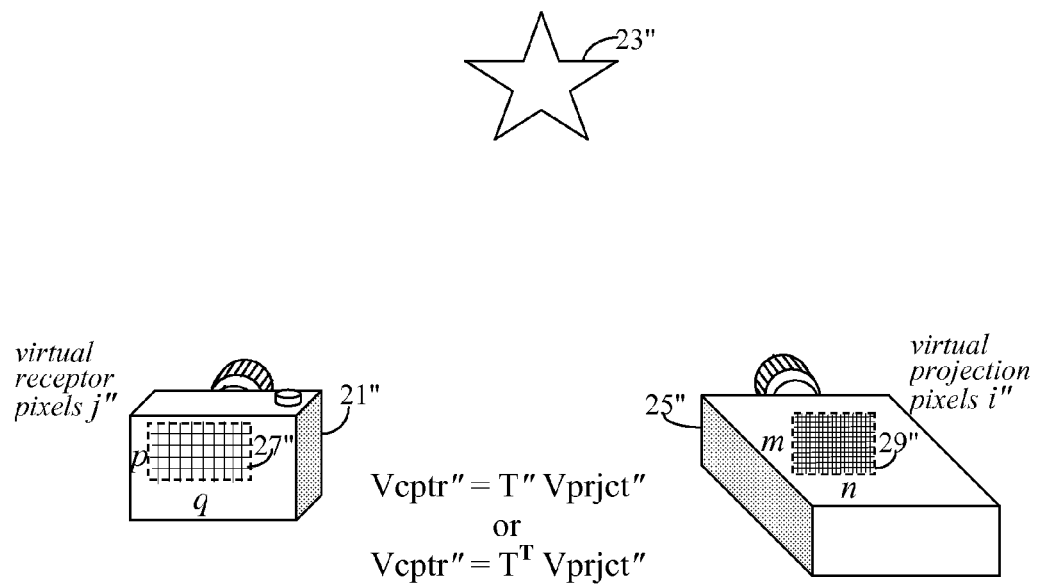

With reference to FIG. 2B, a "dual" setup is one where real projector 21 is replaced by a virtual camera 21" having a virtual image sensor array 27" of equal size as real imaging projection array 27. Thus, virtual camera 21" has an image sensor array 27" comprised of p-rows by q-columns of image sensor elements j".

Similarly, in the "dual" setup, real camera 25 is replaced by a virtual projector 25" having an imaging projection array 29" of equal size as the image sensor 29. Therefore, virtual projector 25" has an imaging projection array comprised of m-rows by n-columns of image projection elements i".

In this case, a virtual image 23" (as projected by virtual projector 25") would be represented by a (m×n) vector, Vprjct". Similarly, a virtual captured image captured by virtual camera 21" could be represented by an (p×q) vector, Vcptr". By the principle of Helmholtz reciprocity, the light transport is equal in both directions (i.e. from real projector 21 to real camera 25, and from virtual projector 25" to virtual camera 21"). Therefore, one can write the dual light transport matrix, T", for the dual setup (i.e. the duality transformation setup) as Vcptr"=$T^T$Vprjct"

Remarkably, the duality transformation between the real light transport matrix, T, and its dual light transport matrix, $T^T$, is the transpose matrix operation known in the art of matrix computation.

As it is known in the art of matrix computation, the transpose operation of a general [x×y] matrix A is denoted by $A^T$ and is defined by an [y×x] matrix whose first column is the first row of matrix A, and whose second column is the second row of matrix A, whose third column is the third row of matrix A, and so on. As is readily evident, this matrix operation simply flips the original matrix A about its first element, such that its first element (i.e. at position (1,1)) remains unchanged and the bottom of the first column becomes the end of the first row. Consequently, if one can captures, or otherwise determines, the real light transport matrix T for a primal setup, then the dual light transport matrix $T^T$ for the dual setup is readily computable by flipping the real light transport matrix T, as described.

As is explained above, real light transport matrix T holds the individual light transport coefficients corresponding between each individual projection pixel j of real projector 21 and all the individual sensor pixels i of real camera 25. Therefore, a determination of each individual light transport coefficient corresponding between an individual projection pixel j and all sensor pixels i should avoid light ray contributions from other projection pixels j in imaging projection array 27.

To accomplish this, one may first consider a full, real projection image [i.e. a (p×q) projection vector Rprjct'] that has zero values for all elements in imaging projection array 27 except for the $j^{th}$ pixel (i.e. the projection pixel under-test for which the light transport coefficients are to be determined), which is set to value 1 (i.e. is turned ON). Then the captured, real image vector [i.e. the (m×n) vector Rcptr'], which is defined as Rcptr'=T Rprjct' is exactly the $j^{th}$ column of matrix T. It is to be understood that since the resolution of real projector 21 is likely to be lower than the resolution of real camera 25, the single light beam emitted from the $j^{th}$ projection pixel under test may fall across several sensor pixels i of image sensor array 29.

Figures 3A, 3B:
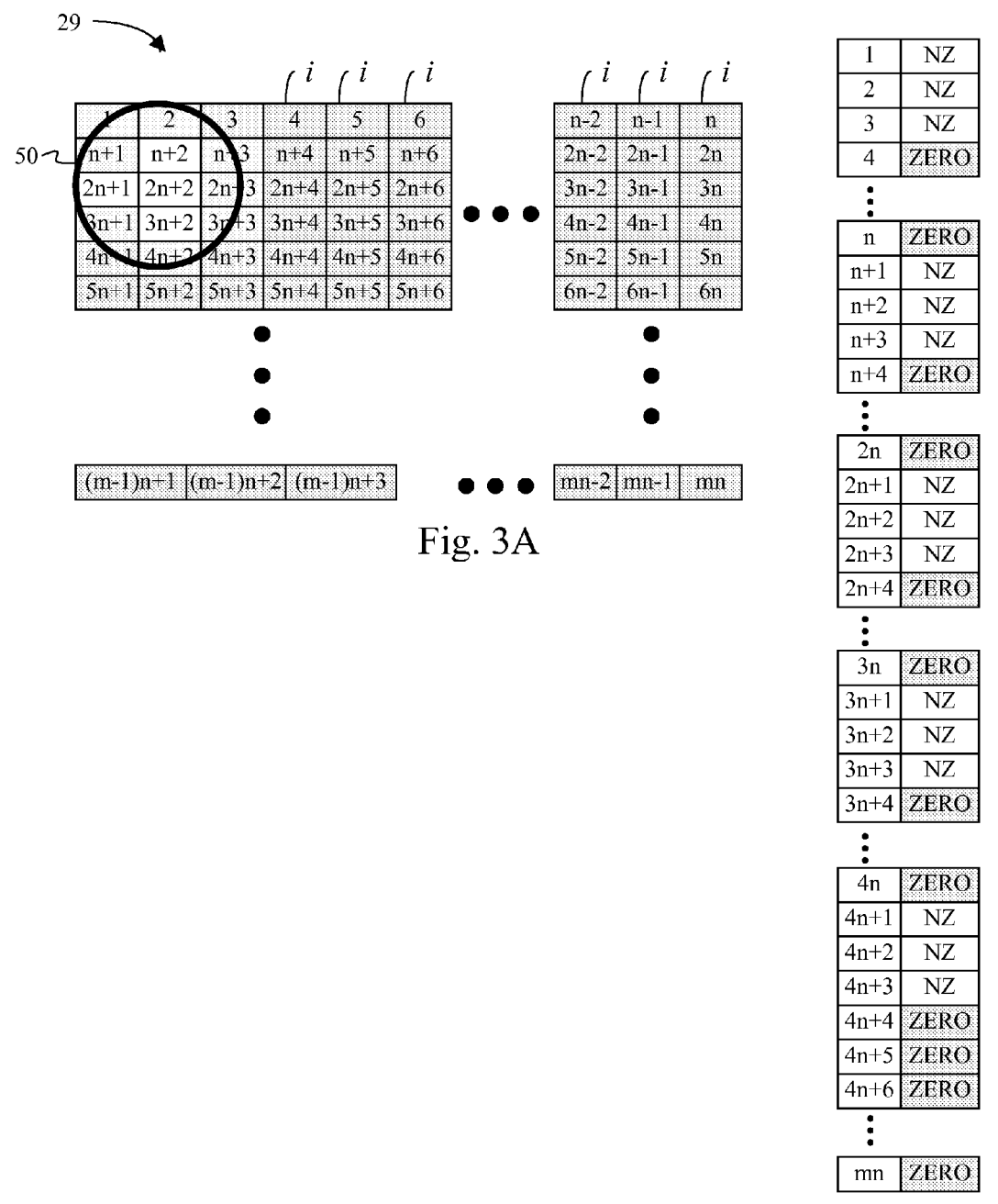

An example of this is shown in FIG. 3A where a partial view of image sensor array 29 shows individually sensors pixels i numbered horizontally from 1 to n on the first row, continuing with (n+1) to (2n) on the second row, and (2n+1) to (3n) on the third row, and so on. Following this sequence, it is to be understood that sensor pixels i along the bottom-most row would be numbered from (m−1)n+1 to (mn).

A light ray footprint 50 of a single light ray from a single projection pixel j impacting sensor array 29 is denoted as a circle. For illustration purposes, those sensor pixels i not within light ray footprint 50 [i.e. those sensor pixels i not hit by the single projection beam emitted from the $j^{th}$ projection pixel] are shown as deeply darken, those pixels i partly covered by footprint 50 are shown as lightly darken, and those pixels i completely within footprint 50 are shown as having no darkening. As it is known in the art, each sensor pixel i that is at least partially covered by light ray footprint 50 will register a light intensity value proportional to the amount of light it receives. This light intensity value may be assigned as the light transfer coefficient for that individual sensor pixel i. Alternatively, the light transport coefficient of each sensor pixel i may be made proportional to the light intensity value registered by the individual sensor pixel i. Nonetheless, those sensor pixels i that are not directly hit by the projection beam from the $j^{th}$ projection pixel will have a value of zero, and thus their corresponding light transport coefficient will likewise have a value of zero.

With reference to FIG. 3B, an example of an image capture vector Rcptr'_j [or $j^{th}$ column of matrix T], as might correspond to the footprint example of FIG. 3A is shown. This $j^{th}$ column of matrix T is illustratively shown as an numbered sequence of vertical light transport coefficients, each corresponding to the numbered sensor pixels i of FIG. 3A. The numerical sequence of capture vector Rcptr'_j preferably follows the horizontally numbered sequence of individual sensor pixels i in image sensor array 29 shown in FIG. 3A. As shown, only those elements in captured imaged vector Rcptr'_j that correspond to sensor pixels covered by light ray footprint 50 have non-zero, i.e. "NZ", values for light transport coefficients. It is to be understood that "NZ" represents any non-zero light coefficient value, and that this value would be related to the amount of light intensity received by the corresponding sensor pixel i. Since light ray footprint 50 spans several rows of image sensor array 29, and each row is sequentially listed in captured image vector Rcptr'_j, several long series of zero valued light transport coefficients may be interspersed between few non-zero, NZ, valued light transport coefficients.

Nonetheless, this method of acquiring a column of light transport coefficients for matrix T for a given $j^{th}$ projection pixel, suggests that a systematic method for capturing the entire matrix T is to sequentially turn ON each projection pixel j of real projector 21 (one projection pixel at a time), and to capture its corresponding real image, Rcptr'_j, with real camera 25. When all p×q projection pixels j have been sequentially turned ON, and their corresponding real images Rcptr'_j have been captured, all the captured image vectors Rcptr'_(1-to-(p×q)) are assembled into matrix T. Each captured image vector Rcptr'_j constitutes a column of light transport coefficient entries in matrix T. This results in a matrix T having (p×q) columns and (m×n) rows of individual light transport coefficients.

This straight forward, and systematic process for determining matrix T, however, is obviously a time-consuming process requiring (p×q) image projection-and-capture steps. Furthermore, the resultant light transport matrix T is very large, consisting of (p×q×m×n) elements. Because of the size of matrix T, computing a dual image is an extremely computation intensive operation requiring matrix multiplication between dual light transport matrix, $T^T$, (which has the same number of elements as matrix T), and virtually projected image vector Vprjct" (which is a long vector having (m×n) elements).

Figure 1A:
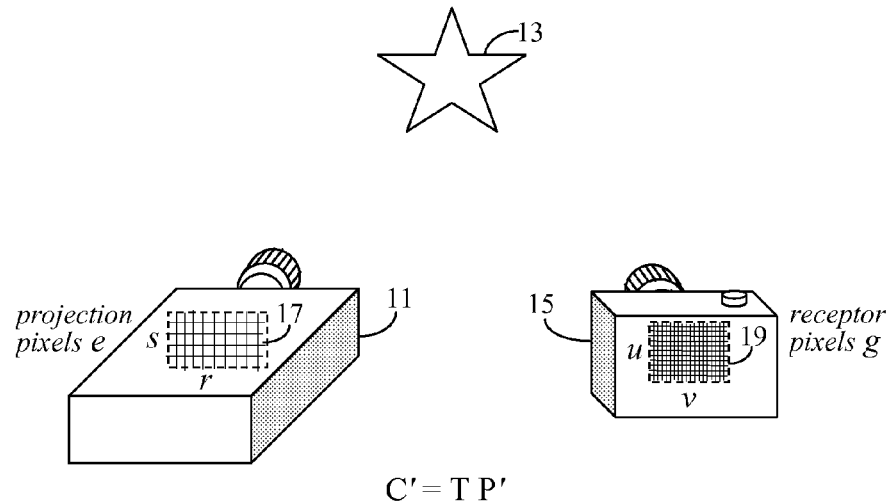
FIGS. 1A and 1B show a prior art setup for implementation of dual photography.
Figure 1B:
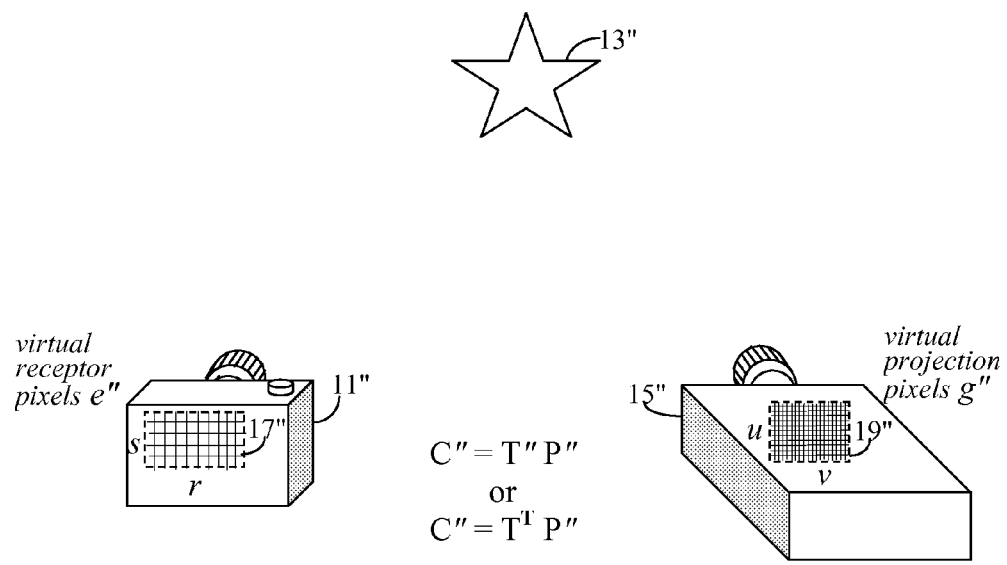

In the past, a scheme for determining matrix T by adaptively turning on multiple pixels of a real projector at a time (such as projector 11 of FIG. 1A), has been suggested to speed up the process of determining matrix T. However, this scheme is complex, and requires that a projection image be divided into multiple zones, and that one pixel from each zone be selected for simultaneous lighting while assuring that simultaneously lit projection pixels are maintained distant enough from each other to eliminate light interference between them. Additionally, this scheme is scene-dependent (i.e. dependent upon the display environment) since it is necessary to assure that interference between individually projected light rays is minimized. Thus, creation of the multiple zones is dependent on the display environment. Therefore, this scheme requires much physical inspection of a projection area and manual setup. Consequently, this scheme does not easily lend itself to general use.

A feature of the present invention proposes a method of reducing the number of procedural steps in the determination of real light transport matrix T. That is, instead of requiring (p×q) image projection-and-capture steps (and the storing of p×q captured images), the presently proposed method captures only "p plus q" [i.e. (p+q)] images.

The present method is based on the following assumptions: for most projector-camera display applications, any two distinct light rays b and c emitted from real projector 21 will typically hit image sensor array 29 in real camera 25 at distinct parts. That is, the overlap in the sensor pixels i hit by light from each of the projected light rays is assumed to be small, and may be ignored.

Of course, this is not true in general. For example, if the scene (i.e. display environment or projection surface/area) consists of a glass of milk (or other light diffusing material), the projected light rays will be diffused by the milk and there will be significant light overlap between the different light rays at the camera's image sensor array. However in a display setup designed to ensure high resolution projections it is virtually guaranteed that each projected pixel will be distinct from the next. That is, in venues, or settings, where high resolution projections are desired, it is likely that the venue will be clear of light diffusing articles along the light path of a projected image.

Continuing with the present novel method for determining matrix T, it is first noted that individual light transport coefficient contributions from projector pixel j map to column j of the light transport matrix T. Assuming minimal overlap between projection pixels, it follows that a first set of projection pixels S1 within imaging projection array 27

[i.e. S1 ⊂ {1, . . . , (p×q)}]

maps to a corresponding set of columns (one per projection pixel) in light transport matrix T. Furthermore, it is assumed that the first set of projection pixels S1 includes target projection pixel j, i.e. the target pixel under test.

Let Rcptr_S1 be a first image captured by real camera 25 of a projected image created by the simultaneous activation of first set of projection pixels S1.

Consider now a second set of projection pixels S2 who share only projection pixel j in common with the first set of projection pixels S1,

[i.e. S1∩S2={j}]

Let Rcptr_S2 be a second image captured by real camera 25 of a projected image created by the simultaneous activation of the second set of projection pixels S2. The light transport coefficients of the $j^{th}$ column of light transport matrix T (which corresponds to the target projection pixel under test, i.e. correspondents to j) may be directly obtain from real captured images Rcptr_S1 and Rcptr_S2 by identifying the one light ray footprint (i.e. similar to light ray footprint 50 in FIG. 3A) they share in common. This common light ray footprint would correspond to a light ray emitted from target projection pixel j, which is the only lit projection pixel that first set S1 and second set S2 share in common.

A method of identifying this common light ray footprint is to conduct a pixel-by-pixel comparison of both captured images Rcptr_S1 and Rcptr_S2. For example, in first captured image Rcptr_S1 only sensor pixels within light ray footprints, each corresponding to the simultaneous lighting of the first set of projection pixels S1, will have non-zero (NZ) light intensity values, and all other pixels in captured image Rcptr_S1 will have zero values, i.e. will be comparatively dark. Similarly in second captured image Rcptr_S2, only sensor pixels within light ray footprints corresponding to second set of projection pixels S2 have non-zero (NZ) light intensity values, and all other pixels will have zero (or dark) values (i.e. below a predefined threshold value). Since the two sets S1 and S2 share only the target projection pixel, j, in common, a direct comparison of both captured images will quickly identify the sensor values corresponding to projection pixel j by identifying the only non-zero region (i.e. non-dark region) common to both Rcptr_S1 and Rcptr_S2. Stated differently, the intersection of the lit regions (i.e. light ray footprints) of Rcptr_S1 and Rcptr_S2 is identified, and this intersection corresponds to the target projection pixel, j.

A method of accomplishing this is to conduct a pixel-by-pixel comparison of both captured images Rcptr_S1 and Rcptr_S2, and retaining only the darker of the two compared pixels. This process may be expressed as:

$$Tj \approx MIN(Rcptr\_S1, Rcptr\_S2)$$

where Tj is the $j^{th}$ column of matrix T, and "MIN" indicates that the lower valued sensor pixel (i.e. the darker pixel having a lower captured light intensity value) in Rcptr_S1 and Rcptr_S2 is retained, and the higher valued (i.e. brighter) sensor pixel is discarded. In this way, the only high intensity values that are retained correspond to a lit footprint common to both S1 and S2.

Stated differently, since the contribution of each individual projection pixel j is mapped to distinct parts of the image sensor array 29 of real camera 25, there is a set of sensor pixels L among sensor pixels 1-to-(m×n), $$[i.e.\ L \subset \{1, \ldots, (m \times n)\}]$$

common to captured image Rcptr_S1 and Rcptr_S2 that corresponds to the target projector pixel, j. It should again be noted that the target projection pixel, j, is the intersection of projection pixel sets S1 and S2, (i.e. j is the only projection pixel common to both sets S1 and S2), such that $$S1 \cap S2 = \{j\}$$

Therefore, among the captured image pixels (in both Rcptr_S1 and Rcptur_S2) that do not correspond to the target projection pixel, j, [i.e. those sensor pixels not in set L, i.e. $\notin L$], at least one of the compared, captured sensor pixels in either Rcptr_S1 or Rcptr_S2 will not have received light. Since sensor pixels receiving light will be brighter than sensor pixels not receiving light, the operation MIN(Rcptr_S1, Rcptr_S2), provides an image where only pixels in set L [i.e. $\in L$] are lit, which is a good approximation of Tj, i.e. the $j^{th}$ column in matrix T.

This implies that if sets of adjacent projection pixels in imaging projection array 27 are lit in columns and in rows, and a first collection of captured images Rcptr_Sy are made for the lit columns of projection pixels and a second collection of captured images Rcptr_Sx are made for the lit rows of projection pixels, then the light coefficients for any individual projection pixel j may be obtained by comparing both collections and identifying the region L where a captured image of a lit column intersect a captured image of a lit row, the intersection corresponding to a light ray projected by activation of projection pixel j, alone.

Thus, a method of determining transport matrix T is to collect a set of images Rcptr_Sy_1, . . . , Rcptr_Sy_q, corresponding to q captured images of q lit columns of projection pixels, and construct a set Rcptr_Sx_1, . . . , Rcptr_Sx_p corresponding to p captured images of p lit rows of projection pixels. Then for all projection pixels j in the imaging projection array of real projector 21 [which consists of projection pixels 1 . . . (p×q)], there exists a pair of row and column image captured sets, Rcptr_Sy_a, Rcptr_Sx_b, such that the intersection region of sets Rcptr_Sy_a and Rcptr_Sx_b correspond to a light ray footprint created by activation of target projection pixel, j. Therefore, one needs to construct sets of projection images $$Rprjct\_Sy\_1, \ldots, Rprjct\_Sy\_q \text{ and } Rprjct\_Sx\_1, \ldots, Rprjct\_Sx\_p$$

where each image Rprjct_Sy_1, . . . , Rprjct_Sy_q is paired with any of images Rprjct_Sx_1, . . . , Rprjct_Sx_p such that each set of paired images shares only one projection pixel in common, such that $$\forall j \in \{1, \ldots, (p \times q)\} \exists Rprjct\_Sy\_a, Rprjct\_Sx\_b | Rprjct\_Sy\_a \cap Rprjct\_Sx\_b = \{j\}$$

The above formula being interpreted to mean that for all projection pixels j in $\{1 \ldots (p \times q)\}$ there exist a pair of projection images, each having a differently constructed pattern such that the intersection of the constructed patterns intersect at a single point corresponding to a common projection pixel. A basic example of such pairs of constructed patterns would be projected pairs of vertical light beams and horizontal light beams. In this case, the intersection of a captured image of a vertical line and a captured image of a horizontal line would include all the sensor pixels i that correspond to a target projection pixel, j, (i.e. pixels i that lie within a light ray footprint created by a light ray emitted from projection pixel j).

Therefore, any column Tj [where j=1, . . . , (p×q)] within transport matrix T can be synthesize from images Rcptr_Sy_1, . . . , Rcptr_Sy_q and Rcptr_Sx_1, . . . , Rcptr_Sx_p.

A scheme that satisfies this property is to use pixel coordinates: let Rprjct_Sx_j be a first projected image such that only pixels with an x-coordinate equal to j are turned ON, and Rprjct_Sy_k be a second projected image such that only pixels with an y-coordinate equal to k are turned ON. Then MIN(Rprjct_Sx_j, Rprjct_Sy_k) gives an image of only coordinates (j, k) turned ON. This process can best be understood with reference to FIGS. 4A, 4B, 5A, 5B, 6A, and 6B.

In FIG. 4A, a scene, or display environment, consists of a flat surface 41 with a checker-board pattern. The relative location of each dark block 43 and each light block 45 that make up the checker-board pattern on flat surface 41 are known, and their known relative displacement may be used to calibrate real projector 21, as is more fully explained below.

Firstly, a bright vertical beam (or column of light rays), 47_k is projected onto surface 41 by real projector 21. In the present case, vertical beam 47_k is generated by turning ON all projection pixels within the imaging projection array 27 that have a y-coordinate equal to k. Real camera 25 then captures this image, Rcptr_Sy_k, as one example of a lit column of projection pixels.

In FIG. 4B, where all elements similar to those of FIG. 4A have similar reference characters, real projector 21 projects a second vertical beam 47_t onto surface 41. In this case, vertical beam 47_t is generated by turning ON all projection pixels having a y-coordinate equal to t. Real camera 25 then captures this image, Rcptr_Sy_t, as another example of a lit column of projection pixels. It is to be understood that real projector 21 would project a separate vertical beam for each of the q columns in it (p×q) imaging projection array 27, and real camera 25 would capture a separate image of each projected vertical beam.

With reference to FIG. 5A, all element similar to those of FIGS. 4A and 4B have similar reference characters and are described above. In the present case, real projector 21 projects a horizontal beam 49_j onto projection surface 41. Horizontal beam 49_j is generated by turning ON all projection pixels having an x-coordinate equal to j. Real camera 25 then captures this image, Rcptr_Sx_j, as one example of a lit row of projection pixels.

In FIG. 5B, real projector 21 projects a second horizontal beam 49_r onto surface 41. As before, horizontal beam 49_r is generated by turning ON all projection pixels having a x-coordinate equal to r. Real camera 25 then captures this image, Rcptr_Sx_r, as another example of a lit row of projection pixels. It is to be understood that real projector 21 would project a separate horizontal beam for each of the p rows in it (p×q) imaging projection array, and real camera 25 would capture a separate image of each projected horizontal beam.

If one now conducts a pixel-by-pixel comparison of captured image Rcptr_Sy_k from FIG. 4A and captured image Rcptr_Sx_j from FIG. 5A (or alternatively compares only their respective vertical and horizontal beams), using operation MIN(Rcptr_Sx_j, Rcptr_Sy_k) to retain only the darker of two compared image pixels and discarding the brighter of the two, one would generate an image 41', as shown in FIG. 6A. All elements in FIGS. 6A and 6B similar to those of FIGS. 4A, 4B, 5A, and 5B have similar reference characters and described above, with the addition of an apostrophe.

Since most of the Rcptr_Sx_j image is the same as image Rcptr_Sy_k (i.e. they mostly consist of the plain checker board pattern on flat surface 41 with projected light rays), retaining the darker of two compared pixels does not change the majority of the resultant image. That is, if two compared pixels are relatively the same, then electing either pixel over the other does not much affect the resultant image 41'. However, when a pixel on vertical light beam 47_k in image Rcptr_Sy_k is compared with a corresponding pixel in image Rcptr_Sx_j that does not lie on horizontal light beam 49_j, then retaining the darker of the two image pixels will discard the bright, beam pixel from image Rcptr_Sy_k, and retain the plain pixel from image Rcptr_Sx_j, which shows no light beam. Therefore, vertical light beam 47_k is eliminated from generated image 41'. Similarly, when a pixel on horizontal light beam 49_j in image Rcptr_Sx_j is compared with a corresponding pixel in image Rcptr_Sy_k that does not lie on vertical light beam 47_k, then retaining the darker of the two pixels will discard the bright, beam pixel from image Rcptr_Sx_j, and retain the plane pixel from image Rcptr_Sy_k, which shows no light beam. Consequently, horizontal light beam 49_j is also eliminated from generated image 41'. However, within the region where vertical light beam 47_k intersects horizontal light beam 49_j, both compared image pixels are bright beam pixels showing an impact by a light ray. Comparison of these two image pixels within this intersection region will result in either of the two bright beam pixels being selected for image 41'. As a result, image 41' will show a brightly lit region 53 corresponding to a projected light ray emitted from coordinates (j,k) of imaging projection array 27. Thus, the light transport coefficients for the projection pixel having coordinates (j,k) can be extracted from generated image 53 without having to have physically captured an image of a light ray projected from the projection pixel at (j,k).

A second example is shown in FIG. 6B, where the combination of real captured images corresponding to FIGS. 4B and 5B (which would respectively correspond to real captured images Rcptr_Sy_t and Rcptr_Sx_r following the above-described naming convention), results in a second brightly lit region 55 corresponding to a projected light ray emitted from coordinates (r,t) of image projection array 27.

A similar process may be followed to identify the light transport coefficients of every projection pixel in imaging projection array 27 without having to individually turn ON and project each projection pixel j, one-at-a-time. This method of generating an image of a hypothetically, singularly activated projection pixel to obtain the projection pixel's light transport coefficients requires only (p+q) captured images, one for each row and column of projection pixels in imaging projection array 27 of real projector 21. Furthermore, once all the pixel projection locations have been identified, the (p+q) captured images may be discarded, and all that needs to be saved is an index and corresponding footprint information.

Figure 7:
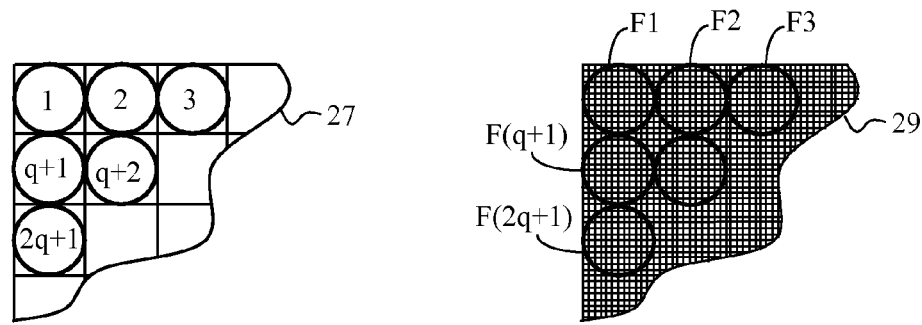
FIG. 7 is first example of an index associating projection pixels to non-zero valued light transport coefficients, as determined by a light beam footprint as generated in FIGS. 6A or 6B.

An example of this approach is shown in FIG. 7, where an index of real imaging projection array 27 is represented as a partial array with circles 1, 2, 3, ... (q+1) ... (2q+1) ... etc. representing individual projection pixels j. Similarly, real image sensor array 29 is represented as a partial array with circles F1, F2, F3, ... F(q+1), ... etc. representing the footprint information corresponding to individually activated projection pixels j. In the present example, footprints F1, F2, F3, ... F(q+1), ... etc. respectively correspond to projection pixels 1, 2, 3, ... (q+1), etc. For illustrative purposes, the partial array representing sensor array 29 is made more denser than the array representing imaging projection array 27 in order to better illustrate that pixel density (i.e. resolution) of real camera 25 may be much greater than the resolution of real projector 21, and thus a light beam emitted from a single projection pixel j may create a light footprint spanning several sensor pixels i.

Following this approach, only two sets of information need to be stored. A first set of information corresponds to an index of projection pixels and a second set of information corresponds to sensor pixel footprint information corresponding to each projection pixel. In other words, zero coefficients need not be stored, which greatly reduces the memory requirements.

Figure 8:
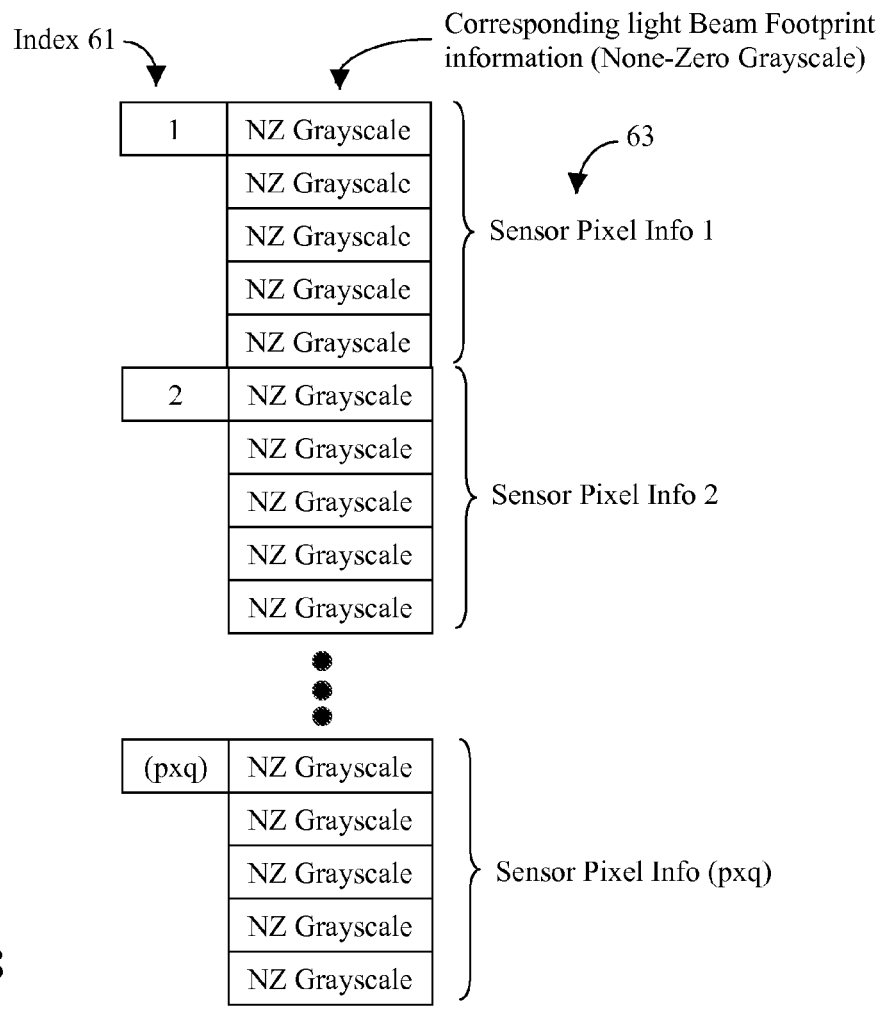
FIG. 8 is second example of an index associating projection pixels to non-zero valued light transport coefficients, as determined by a light beam footprint as generated in FIGS. 6A or 6B.

A second example of organizing this information is shown in FIG. 8, where an index 61 of projection pixel is shown to point, or correspond, to a groups 63 of grayscale (i.e. non-zero) sensor pixel information (i.e. corresponding to a resultant light beam footprint).

Having shown how to reduce the number of images that need to be captured and stored to generate the needed light transport coefficients in preparation for dual photography, the following now addresses some of the practical difficulties of implementing dual photography. As is explained above, a light transport matrix T can be very large, and its use (or the use of its transpose, the dual light transport matrix $T^T$) requires large amounts of active memory (for example, DRAM) and excessive computational processing power/time. Therefore, general use of the dual image has heretofore not been practical.

To efficiently construct a dual image, one first notes that $$Vcptr'' = T^T Vprjct''$$

Since the virtual image sensor array 27" in the virtual camera 21" corresponds in actuality to real imaging projection array 27 of real projector 21, it is convenient to use the same index j to denote any virtual sensor pixel within Vcptr" obtained by virtual camera 21". Therefore, a relationship between each virtual projection pixel j in a virtual captured image versus a corresponding row of elements in $T^T$ may be denoted as $$Vcptr''(j) = T^T_j Vprjct''$$

where $T^T_j$ refers to the $j^{th}$ row in $T^T$.

As is explained above, $T^T$ is the transpose of light transport matrix T (i.e. matrix T turned on its diagonal), and the values of row $T^T_j$ (where j is any value from 1 to (p×q)) therefore correspond to the $j^{th}$ column of matrix T (i.e. $T_{COL}\_j$). Since each column of T has (m×n) elements (i.e. equivalent to the pixel resolution of real camera 25), this would appears to be a very large number of elements. However, recalling that in the present implementation, only a limited number of elements in each column of matrix T are non-zero (i.e. only those corresponding to camera sensor pixels i upon which shone the intersection of a vertical and horizontal light beam, i.e. a light footprint), it is self apparent that only a few of the (m×n) elements within in each column j of matrix T (and subsequently in each row $T^T_j$) are non-zero. Therefore, it is not necessary to examine all elements in $T_{COL\_j}$ when computing Vcptr" (j). Indeed, as is explained above, it is preferred that only a single index 61 showing all individually projected pixels, and their corresponding light beam footprint information 63 be stored, as illustrated in FIGS. 8 and 7.

As is shown in FIG. 8, index 61 associates a listing of grayscale entries 63 for each projected light beam (from an individual projection pixel j of real projector 21). It is to be understood that each group of grayscale entries 63 corresponds to the non-zero entries within each column of T, and only these non-zero grayscale values need to be examined during each matrix operation of a column of T. Thus, the number of calculations needed to for determining each value of Vcptr" (j)=$T^T_j$ Vprjct" is greatly reduced.

In other words, this subset of elements, SVcptr"(G), within each column G of matrix T that needs to be processed may be defined as $T_{COL\_}G(\alpha)$, where $\alpha$ is an index for any virtually captured pixel [i.e. $\alpha \in \{1, \ldots, (p \times q)\}$] in Vcptr"(G). Therefore, for each SVcptr"(G), one can define the set of elements to be examined as:

$$SVcptr"(G) = \{a | \forall z \in \{1, \ldots, (p \times q)\} T_{COL\_}G(a) \geq T_{COL\_z}(a)\}$$

Since in general ||SVcptr"(G)||<<(p×q), it takes significantly less time to compute:

$$Vcptr"(G) = \sum_{\alpha \in SVcptr"(G)} T^{TG}(\alpha) Vprjct"(\alpha)$$

than to compute:

$$Vcptr"(j) = T^T_j Vprjct"$$

Figure 9A:
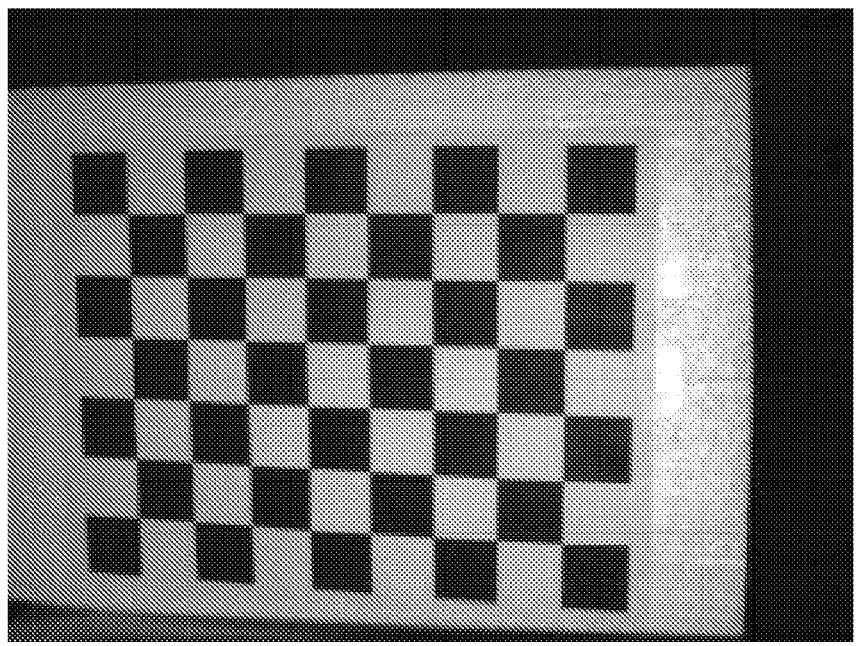
FIG. 9A shows a real captured image taken by a real camera.
Figure 9B:
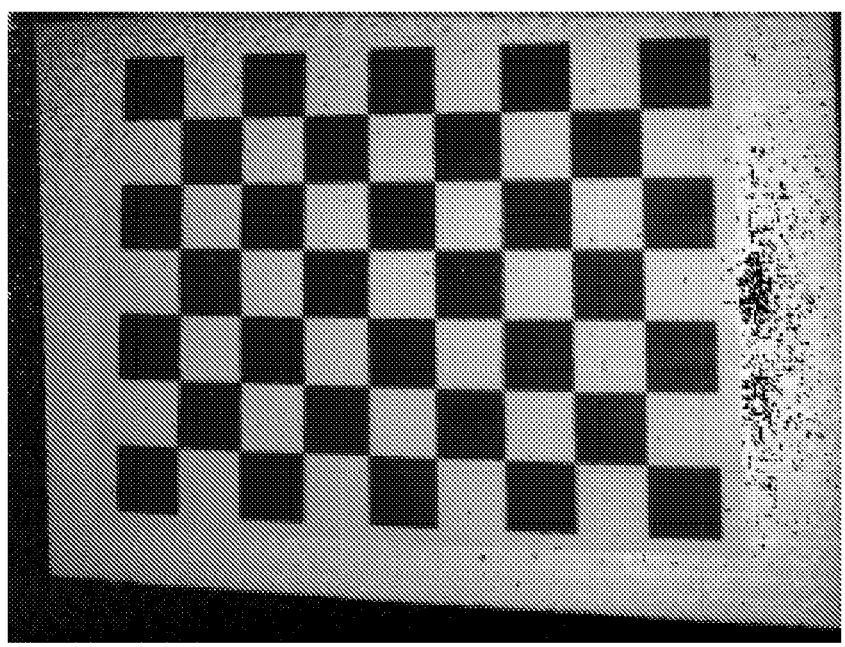
FIG. 9B shows a dual captured image, as seen by a real projector, as generated using the method of the present invention.

An example of a dual image generated using this method is shown in FIGS. 9A and 9B. FIG. 9A shows a primal image, as projected by a real projector. FIG. 9B shows the resultant dual image computed by an implementation of present method. The dual image of FIG. 9B represents the image virtually captured by the real projector 27 (i.e. virtual camera 21"), or stated differently, the image as "seen" by the real projector 21.

The above discussion shows how to compute dual images efficiently from a reduced set of images, which saves image capture time as well as computation time. As is explained above, the real captured images and dual captured images can be used to calibrate both real camera 25 and real projector 21, respectively.

That is, since the images from the projector's view cannot be directly captured, a straightforward solution is to construct projector-view images (i.e. dual images) from corresponding camera images using dual photography techniques, and then to calibrate the projector using the constructed images. For example, after having taken several real images at different angles of a known object with carefully measured features, the real camera can be calibrated by using the known dimensions of the object to compensating for distortions in the captured images arising from the different angle views. The virtual images, as seen by the real projector, can then be generated from the same captured images using dual photography techniques, as described above, and the real projector may be calibrated in a manner analogous to the real camera.

A possible set-back associated with this straight forward method, however, is the difficulty in generating and manipulating the light transport matrix T, and operating on the large image vectors resulting from the large number of camera and projector image pixels. Although this labor-intensive and expensive process is mitigated substantially by using the dual photography method described above, for purposes of calibrating real projector 21 in a projector-camera system, such as that shown in FIG. 2A, Applicants have developed a novel method that avoids the need for generating a T matrix and create a full dual image, while still taking advantages of some of the benefits of using a dual image (i.e. an image as "seen" by real projector 21) to ease calibration of real projector 21.

The generation of the T matrix can be avoided altogether by noting that to calibrate the projector, one does not need to construct an entire dual image, but only needs to determine the location of the corners of the squares within the checker board pattern on flat surface 41 (see FIG. 4A), as seen by the projector. Applicants have adapted a homography-based method to achieve this goal, and thus avoid the generation and manipulation of the T matrix of fully-applied, dual photography. This alternate embodiment of the present invention directly computes the coordinates of the checker corner features across the projector-view images without requiring the construction the dual images and the detection of the corners from the constructed dual images.

In this novel method, the real camera 25 is first calibrated using any known method, such as the previously described method of capturing multiple images of a known pattern at different angles. More specifically, one may use the real camera to capture a number of images of a planar checker board at different poses and detect the checker corners across the captured images. It is to be understood that that a checker board is being used purely for illustrative purposes, and any scene may be captured as long as physical distances between key points are known. In the present case, since the physical distances between the checker corners on the board have been previously measured, their captured images at different poses are sufficient to compute the internal and external camera parameters, as was describe above.

Secondly, it is observed that projector images follow the so-called perspective projection model, which relates two (or more) views of a single scene as seen by two (or more) separated sources. That is, different viewing sources will "see" a different view (or image) of the same scene since the different sources are located at different angles to the scene. However, since there is only one real scene (irrespective of the number of views of the scene), one can generate a mathematical relationship between the different views that will associate any point on any one view to a corresponding real point on the scene (and thereby to all other views).

If one of these separated views is assumed to be a virtual image as "seen" by a real projector, while a second separated view is deemed to be a real image captured by a real camera, then the perspective projection model (which relates the two views to the common, real scene) would permit one to extract from the captured real image some information relating to the virtual image, without generating a full dual image.

Using this approach, Applicants have devised a method of extracting sufficient information for calibrating a real projector without requiring a full dual image. Thus, although no dual image has been created, one can still apply a camera calibration technique to a projector, albeit in a round-about way.

Under the perspective projection model, the relationship between two image projections of a planar object from different views is a simple linear projective transformation or homography. This transformation relates the coordinates of any point on the planar object (i.e. a homogeneous coordinate) to the coordinates of a corresponding point on a specific view of the planar object. In the present embodiment, the projector-view image of the planar checker board is a homography of the corresponding camera image. Specifically, for any point P on the checker board, its homogeneous coordinate in the projector-view image Up=(up, vp, 1) and the coordinate in the camera image Uc=(uc, vc, 1) satisfy the following equation, $$Up=\lambda HUc$$

where $\lambda$ is a scalar and H is the 3×3 homography transformation matrix (as known in the art) of which the bottom right entry is set to 1. The pair of corresponding coordinates provide 3 linear equations, where one of them determines the scalar and the other two are used to determine H, the homography transformation matrix. Since there are 8 unknown entries in 3×3 matrix H, given the correspondence of between N coordinate points (where N≧4) on the checker board, the homography between the projector-view image and the camera image can be recovered by solving the 2N linear equations. The greater the number of N, the lower the error relating coordinate points between the projector-view and the camera image.

To obtain the corresponding coordinates, 10 white points are preferably projected on the checker board pattern, an image of the checker board with the projected white points is captured using a real camera, such as real camera 25, and the coordinates of the 10 points in the camera image are computed. In the present process, it is only necessary that the ten points be distinguished during the computation of their corresponding coordinates in the captured image. This may be achieved by projecting the ten points sequentially, and determining their corresponding coordinates, in turn. Alternatively, differently colored points may be projected simultaneously, and the different points identified by color.

Since the projector preferably projected the points in a known relation to each other, the coordinates of the points in the projected image are known. This results in 10 pairs of corresponding coordinates, one set as captured by the real camera and a second set as projected by the real projector. Once the homography is recovered, the coordinates of the checker board corners detected in the camera images can be directly transformed to compute the corresponding corner coordinates in the projector-view images. The projector parameters can then be calibrated using a camera calibration method, such as the one described above.

Figure 10:
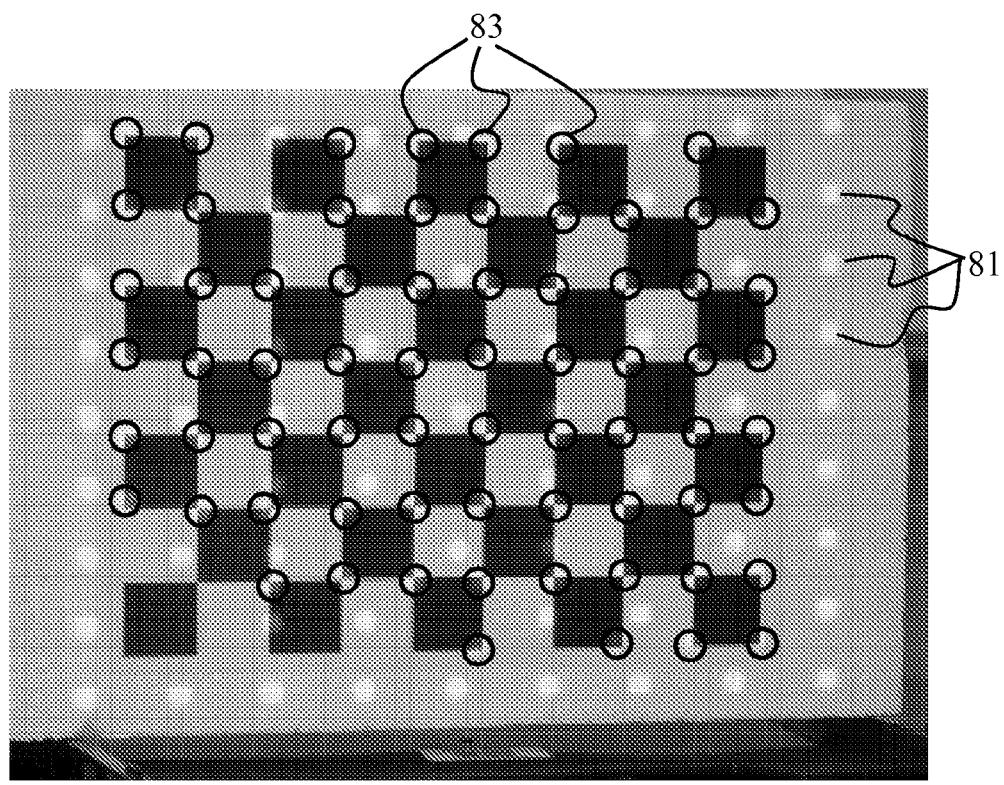
FIG. 10 is resultant example of application of the use of nomography to calibrate a projector.

An example of this approach is shown in FIG. 10. In FIG. 10, the feature capture results are as follows. The circles, or dots, not shown in outline (for example dots 81) were used for estimating nomography, while the outlined circles, or dots, (for example dots 83) are the corner point features. As can be seen, the outlined dots 83 are on the actual corners, indicating that the projector coordinates for each detected corner has been correctly captured.

A still alternate embodiment may be obtained by taking another look at the setup of FIG. 2A. As is explained above, a real captured image (Rcptr') is related to a real projected image Rprjct' by the light transport matrix T. As is also explained above in reference to FIG. 2B, a virtual captured image Vcptr", as captured by projector 21' (illustratively shown as a virtual camera 21") if a projector could capture images, is related to a virtual projected image Vprjct", as projected by camera 25' (illustratively shown as a virtual projector 25") if a camera could project images, by the transpose of light transport matrix T (i.e. $T^T$). That is, Vcptr"=$T^T$ Vprjct". However, there are situations where using the inverse of transport matrix T, instead of its transpose, may be useful. For example, in article "A Theory of Inverse Light Transport" by Seitz et al. (IEEE International Conference on Communications, ICC V05,), hereby incorporated in its entirety by reference, the inverse of the light transport matrix T was used in to analyze the way light bounces in arbitrary scenes. In this approach, a scene is decomposed into a sum of η-bounce images, where each image records the contribution of light that bounces η times before reaching a camera. Using a matrix of "impulse images", each η-bounce image is computed to infer how light propagates through the scene.

Another example of how the inverse of transport matrix T may be used can be understood by reconsidering the projector-camera system of FIG. 2A, where Rcptr'=T Rprjct'. If one has an image (such as Rcptr', for example) but wants to infer an unknown projection source that can produce the image, one can compute Rprjct'=$T^{-1}$ Rcptr'. Note that $T^T$ Rprjct" shows virtually captured image Vcptr", which is a different view of Rcptr', but does not show the real source of projected image Rprjct'.

$T^{-1}$ is however harder to compute than the transpose, requiring much more computational resources. Worse, it is not always possible to find the inverse of an arbitrary matrix. That is, some matrixes may not have an inverse. Fortunately, Applicants have found that in many display settings an approximation to the inverse of transport matrix T can be computed. As it is known in the art, the identity matrix, or unit matrix, is denoted by I, and has the property that for a given matrix A, the following relationship holds:

$$AI=IA=IA$$

If matrix A were a matrix of order m by n, then the pre-multiplicative identify matrix I would be of order m by m, while the post-multiplicative identify matrix I would be of order n by n.

The multiplicative inverse of a matrix is typically defined in terms of identify matrix I. A left multiplicative inverse of a matrix A is a matrix B such that BA=I, and a right multiplicative inverse of a matrix A is a matrix C such that AC=I If the left and right multiplicative inverse of a matrix A are equal, then the left and right multiplicative inverse is simply called the "multiplicative inverse", or inverse, and is denoted by $A^{-1}$.

In general, $T^{-1} \neq T^T$. However, as discussed above, for most projector-camera display applications, any two distinct light rays j and k emitted from a projector will typically hit a camera sensor at distinct parts, i.e., there is usually little overlap in the camera sensor pixels hit by light from each of the light rays j and k. Of course, this is not true in general, such as the example given above where the scene consists of a glass of milk, and the light rays are diffused by the milk resulting in significant overlap. However in a display setup designed to ensure high resolution projections it is virtually guaranteed that each pixel projected will be distinct from the next.

As is also explained above, each column of the transport matrix T is the projection image of one pixel from the projector. Thus all of the column entries have zero values except those corresponding to the camera pixels hit by the projector pixel. Under this display setting, and with the assumption that camera pixels corresponding to different projector pixels do not overlap with each other, the columns of T are orthogonal to each other, meaning that that the transpose of a specific column multiplied by any column other than itself will produce a zero result.

To determine the inverse of T, i.e. $T^{-1}$, it is beneficial to first note that $AA^{-1}=I$, and the identify matrix I is comprised of a matrix with numeral 1's along a diagonal from the top left corner (starting at point 0,0) to the bottom right corner (ending at point r,g) and zeros everywhere else. Therefore, to compute $T^{-1}$, a matrix $\check{T}$ is constructed such that each column in $\check{T}$ is comprised of normalized values of corresponding values in a corresponding column in T. That is, $$\check{T}r = Tr/(\|Tr\|)^2, r=1, 2, 3, \ldots, pq$$

where $\check{T}r$ is the $r^{th}$ column of $\check{T}$. Since the operation $\|Tr\|$ defines the square root of the sum of the squares of all values in column r of matrix T, the square of $\|Tr\|$ is simply the sum of the squares of all the values in column r. That is, $$\|Tr\| = \sqrt{\left\{\sum_{\varepsilon}^{\omega}(Tr_\varepsilon)^2\right\}}$$

By dividing each value entry in column r by the sum of the squares of all the values entries in column r, operation $\{Tr/(\|Tr\|)^2\}$ has the effect of normalizing the value entries in column r of matrix T. If one now takes the transpose of $\check{T}r$, i.e. flips it on its side such that the first column becomes the top row and the last column becomes the bottom row, the result will be rows of elements that are the normalized values of corresponding columns of elements in T. Therefore, for every column in T, one has the following result:

$$(\check{T}r^T) \times (Tr) = 1$$

and $$(\check{T}r^T) \times (Tg) = 0, \text{ for } r \neq g$$

In other words, multiplying a column of T with a corresponding row in $\check{T}r^T$ always results in numeral 1, and as one multiplies all the columns in T with the corresponding row in $\check{T}r^T$, one produces a matrix with numeral 1's along its diagonal, and one may place zeroes everywhere else.

Therefore, in the case of matrix T, where columns are orthogonal to each other, and given the specific construction of matrix $\check{T}$, one has that the transpose of $\check{T}$ is equivalent to the inverse of T (i.e. $\check{T}^T = T^{-1}$), by definition, or at least $\check{T}$ is a left multiplicative inverse of T. Therefore, Rprjct'=$\check{T}^T$ Rcptr'.

Note that only part of the projector pixels that actually hit the camera sensor can be recovered. For the projector pixels not hitting any of the camera pixels, the corresponding columns in $\check{T}$ contain purely zeros and the above equation of $\check{T}r = Tr/(\|Tr\|)^2$ is undefined. In such cases it is preferred that the corresponding columns in $\check{T}$ be set as zero columns. Thus $\check{T}^T$ is the inverse of the part of T that covers the overlapping area of the field-of-views of the projector and the camera. It only recovers the projector pixels in Rprjct' that fall in the overlapping area and blacks out the other pixels.

Having defined a method for approximating the inverse of matrix T, it will now be shown how dual photography can be used with an immersive display system to achieve advanced and complex setups.

Figure 11:
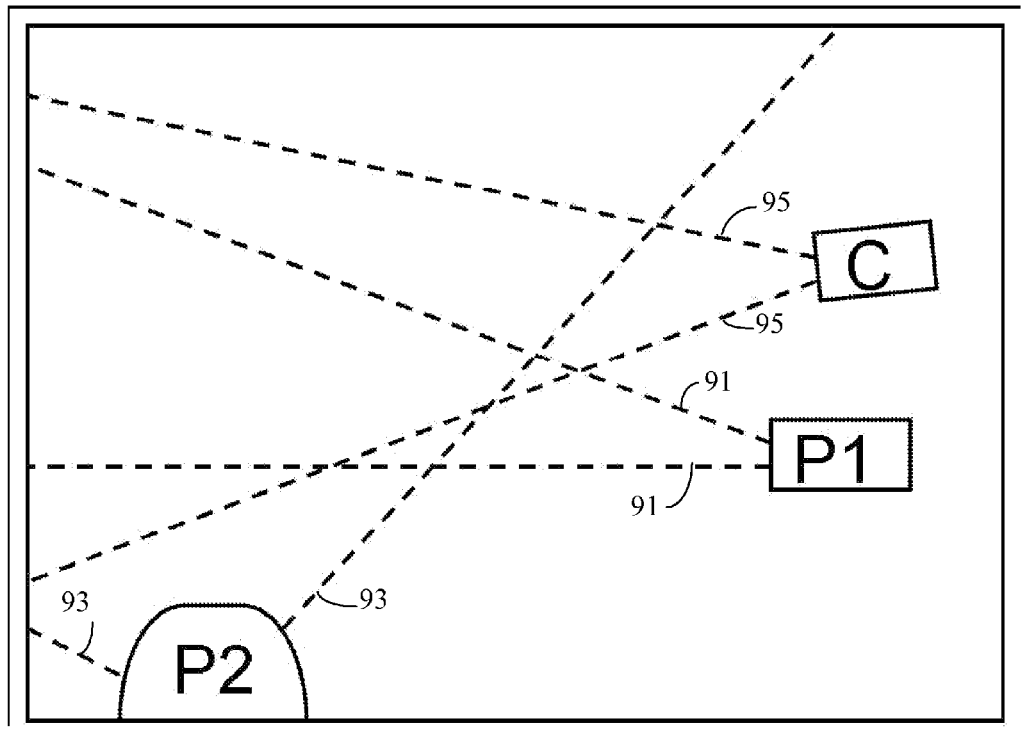
FIG. 11 is an exemplary projection setup for using dual photography to create an immersive display system.

With reference to FIG. 11, in a preferred embodiment, a conventional front projector P1 (similar to projector 21 of FIG. 2) is used in conjunction with an immersive projector P2. As indicated by field-of-view lines 91, in the presently preferred embodiment the portion of a display surface covered by the field-of-view (i.e. FOV) of front projector P1 is a subset of the FOV of immersive projector P2, as indicated by field-of-view lines 93. Since the FOV of front projector P1 is entirely within the scope of the FOV of immersive projector P2, it would be desirable to have immersive projector P2 simulate the projected image produced by front projector P1. It should be emphasized, however, that in general, the FOV of front projector P1 does not necessarily need to overlap any part of the FOV of immersive projector.

Although, it is not necessary that the FOV of immersive projector P2 overlap any part of the FOV of front projector P1, it is desired that two transport matrices separately associating a camera C to front projector P1 and to immersive projector P2 be created. As it would be understood, the two transport matrices may be generated separately since the FOV's of P1 and P2 do not necessarily overlap.

However, in the specific example of the presently preferred embodiment, camera C is placed such that the FOV of camera C is a superset of the FOV of front projector P1 and a subset of the FOV of immersive projector P2. As indicated by field-of-view lines 95, the FOV of camera C completely encompasses the FOV of front projector P1, but is entirely engrossed by the FOV of immersive projector P2. To simulate the projected image from front projector P1 using immersive projector P2, one first determines a first light transport matrix, $T_1$, relating a first projected image $p_1$ from front projector P1 to a first captured image $c_1$ captured by camera C such that $c_1 = T_1 p_1$, and determines a second light transport matrices, $T_2$, relating a second projected image $p_2$ from immersive projector P2 to a second captured image $c_2$ captured by camera C such that $c_2 = T_2 p_2$. Consequently, one has the following relation $$c_1 = T_1 p_1$$

and $$c_2 = T_2 p_2$$

In order to simulate projected image $p_1$ from front projector P1 using immersive projector P2, one needs $c_1$ (i.e. the captured, projected image from front projector P1) to be the same as $c_2$ (i.e. the captured, projected image from immersive projector P2), i.e. one needs $$c_2 = c_1$$

which lead to the relation:

$$T_2 p_2 = T_1 p_1$$

solving for $p_2$, one obtains the following relation:

$$p_2 = (T_2^{-1})(T_1 p_1)$$

Figure 12:
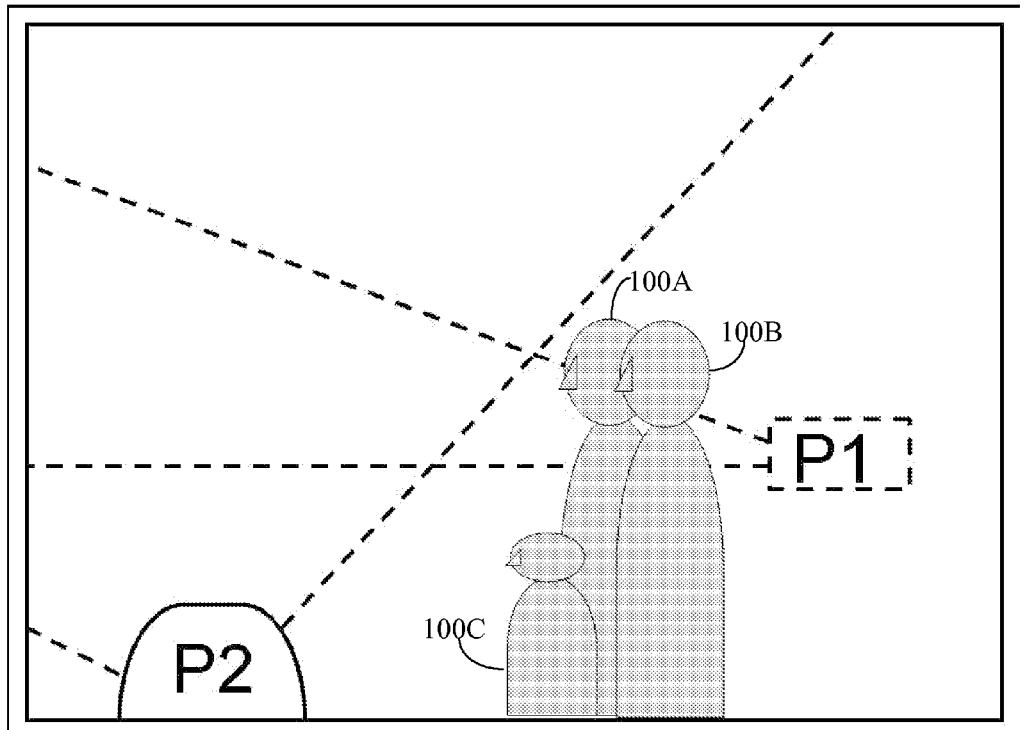
FIG. 12 shows an immersive projector P2 being used to simulate a front projector P1".

This means that to create image $p_1$, one can use front projector P1, or the same effect can be achieved by projecting the transformed image $(T_2^{-1})(T_1 p_1)$ on immersive projector P2. This is shown in FIG. 12, where immersive projector P2 is used to simulate a front projector, such as projector P1 of FIG. 11. In FIG. 12, a virtual projector P1", as simulated by immersive projector P2, is denoted by dotted lines. Therefore, image $p_1$, as projected by front projector P1 in FIG. 11, can be recreated by projecting transformed image $(T_2^{-1}) \times (T_1 p_1)$ on immersive projector P2 in FIG. 12 to simulate a front projected image such that viewers 100a, 100b, and 100c do not have to concern themselves with occluding any front projector.

Figure 13:
FIG. 13 is an example of an image generated using the virtual projector implementation of FIG. 12.

An example of an image generated using this virtual projector implementation is shown in FIG. 13. A front projector image 101 is simulated using a large field-of-view display system. Projector 103, located along the bottom of FIG. 13 is part of the large field-of-view display system, and is used to generate image 101 shown in the center of FIG. 13.

Figure 14A:
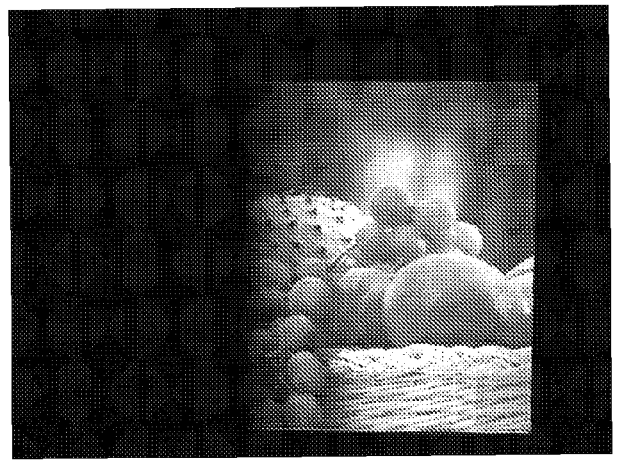
FIG. 14A shows the right side of an image projected by a real front projector.
Figure 14B:
FIG. 14B shows the corresponding left side of the image shown in FIG. 14A, but in FIG. 14B the left side of the image is projected by an immersive projector.
Figure 14C:
FIG. 14C shows the right side image of FIG. 14A joined to the left side image of FIG. 14B.

FIGS. 14A to 14C illustrate the quality of the simulation by showing the real and simulated displayed images side-by-side. FIG. 14A shows the right side of an image projected by a real front projector, such as P1 of FIG. 11. FIG. 14B shows the corresponding left side of the image shown in FIG. 14A, but in FIG. 14B the left side of the image is projected by an immersive projector, such as P2 of FIG. 12, to simulate a virtual front projector, such as P1" of FIG. 12. The quality of the simulated front projection, as created by the immersive projector is better illustrated in FIG. 14C, where the right side image of FIG. 14A is shown joined to the left side image of FIG. 14B, side-by-side, resulting in a seamless registration of the images created by a real front projector and a simulated, virtual front projector.

Figure 15A:
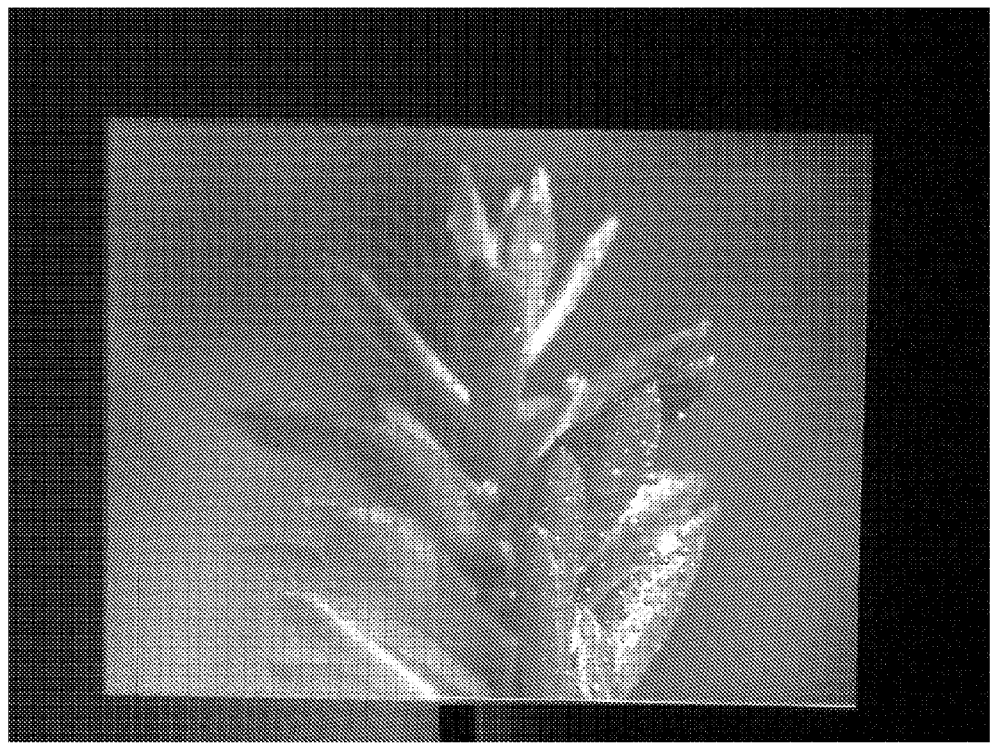
FIGS. 15A and 15B two additional examples of a left side image generated by an immersion projector joined to the right side image generated by a front projector.
Figure 15B:
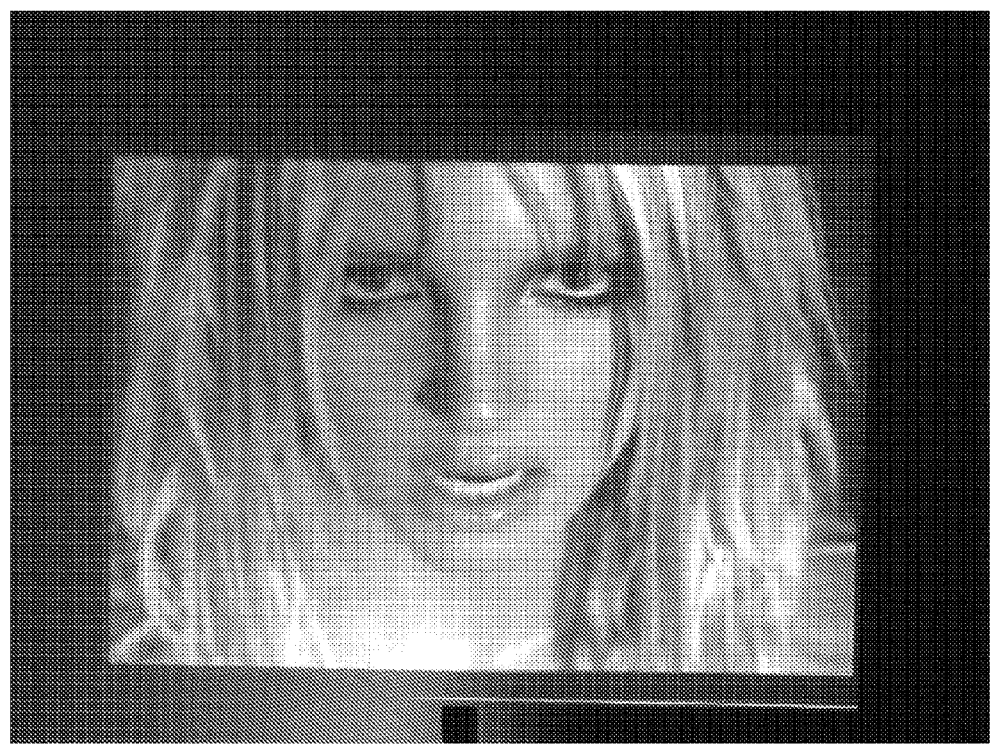

Two additional examples showing side-by-side comparisons of images created by a real front projector and images created by an immersive projector to appear as if they were generated by a front projector are shown in FIGS. 15A and 15B. In both FIGS. 15A and 15B, the left half of the shown image is created by an immersive projector to simulate a display from a virtual front projector, and the right side half of the shown image is created by a real front projector.

Figure 16A:
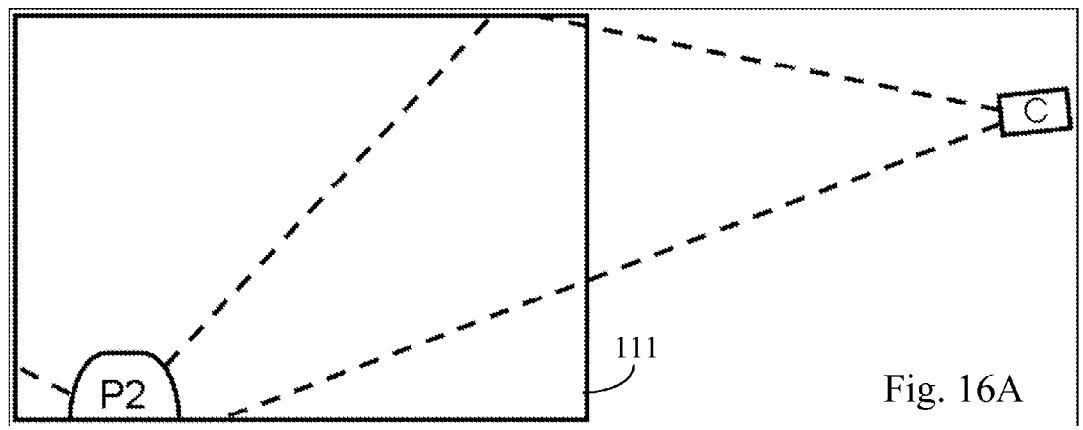
FIGS. 16A to 16C show an alternate application of the present invention to recreate in a real room a virtual image created in a virtual model room.
Figure 16B:
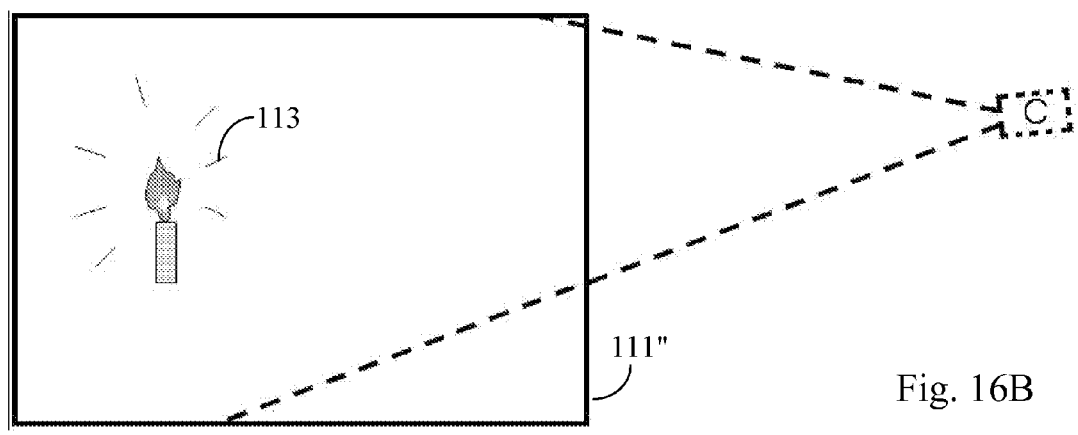
Figure 16C:
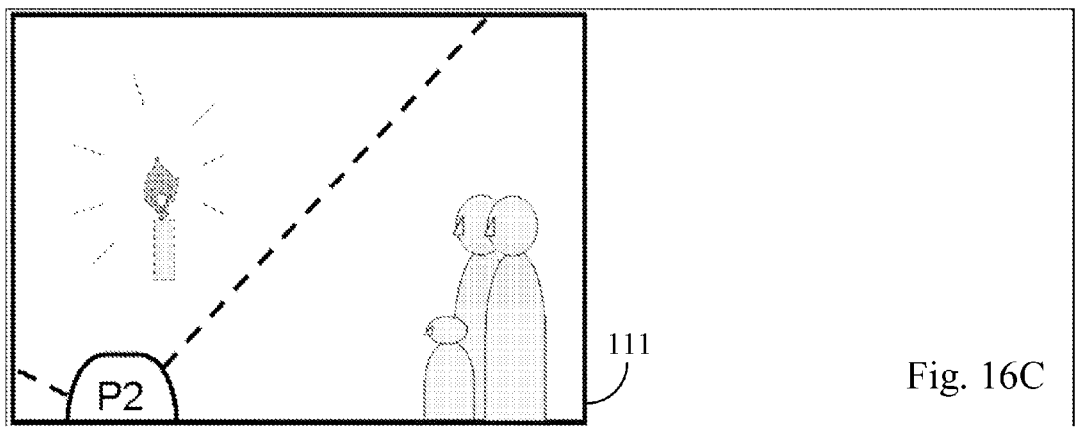

An alternate application of the present technique is better understood with reference to FIGS. 16A to 16B. In the present example, immersive projector P2 of FIG. 16C will be used to create various ambient lighting effects. To achieve this, camera C is positioned such that its FOV covers a significant portion of a display room 111, as shown in FIG. 16A. In FIG. 16A, camera C and immersive projector P2 are positioned such that the FOV of camera C encompasses most, if not all of the FOV of immersive projector P2. In the present example, P2 is shown as an immersive projector, but projector P2 may be any type of a projector, such a front projector. To establish a relationship between camera C and projector P2, a light transport matrix $T_3$ relating camera C to projector P2 is captured, i.e. determined, using any of the methods described above. Once this is done, an image $c_3$ as viewed (i.e. captured) by camera C will be related to a projected image $p_3$, as projected by projector P2, according to the following relationship:

$$c_3 = T_3 p_3$$

which results in $$p_3 = (T_3^{-1}) \times (c_3)$$

Consequently, one can build a virtual model of display surfaces of room 111. The virtually modeled room 111", shown in FIG. 16B, may be a computer simulation, for example. Once virtual room 111" is created, various simulated lighting effects may be added to modeled room 111". For example, FIG. 16B shows virtual model room 111" being lit by candle light from a large candle 113. The computer model further models the position and resolution of camera C (of FIG. 16A), shown as dotted box C in FIG. 16B. The computer model then "captures" (i.e. creates) a synthetic view $c_3$" of simulated room 111" from the viewpoint camera C to simulate a real image of virtual room 111" as if it had been taken by real camera C of FIG. 16A. The simulated lighting effects of FIG. 16B can then be recreated in real room 111 of FIG. 16C using P2 by projecting the transformed image $(T_3^{-1}) \times (c_3")$.

Figure 17:
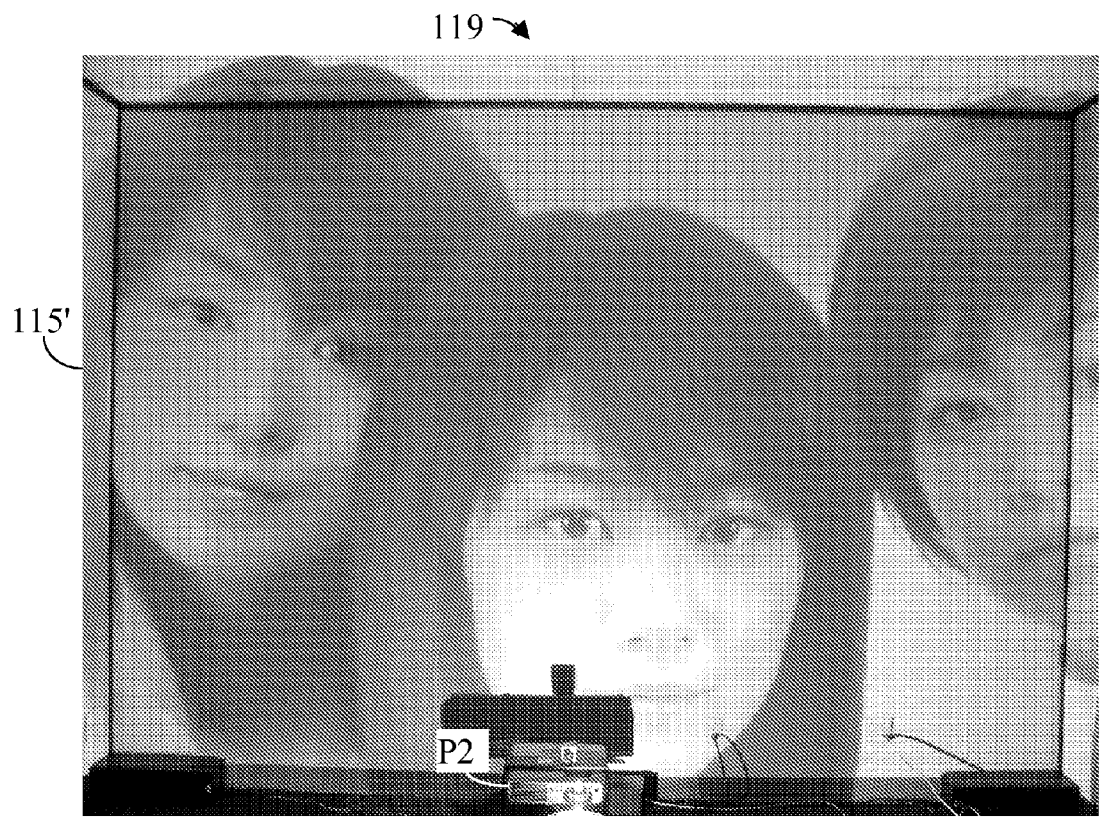
FIG. 17 is an example of the technique of FIGS. 16A-16C to project an image bigger than the projection space in a real room without image distortion.

An example of an application of this technique is shown in FIG. 17. In the present case, it is desired to project an image 117 that is bigger than the wall of a real room 111. As was discussed above, various techniques may be used to calibrate a real projector to compensate for the angles of the walls and ceiling to the projection wall of real room 111, but the present invention solves this problem using a different approach. In the present example, virtual room 111" (of FIG. 16B) has dimensions similar to real room 111 (of FIGS. 16C and 17), and image 117 is superimposed (i.e. projected) onto virtual room 111". Image distortions, if any, can be readily corrected within the modeled room 111". A synthetic view $c_3$" of image 117 without distortion on simulated room 111" from the viewpoint camera C is then created. Immersive projector P2 is then made to project transformed image $(T_3^{-1}) \times (c_3")$ to recreate the corrected oversized image 117 on a wall of real room 111. As is shown in FIG. 17, the result is an undistorted projection that did not require calibrating projector P2 to compensate for curvatures (or other irregularities) on a projection surface.

The above described techniques may be applied to the creation of large field-of-view, i.e. FOV, displays. A larger FOV increase the sense of immersion and provides a more engaging experience for a viewer. The present approach describes an immersive projection system with a very large FOV. The system is also designed with a built-in large FOV camera/light sensor that is able to capture light from the areas covered by the projection FOV. The sensor allows the system to adapt the projected light so as to optimize image quality and more generally allow the system to interact with its environment. Although the present system is primarily motivated by the desire to display surround video content, it is important to note that this new projection system can also be used to view conventional video content.

Figure 18:
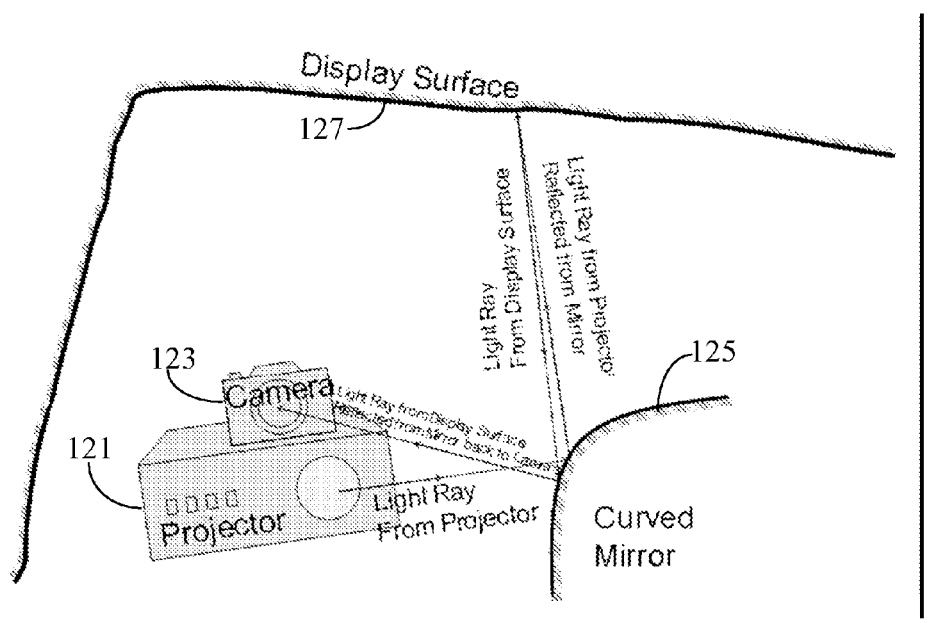
FIG. 18 is an exemplary projection system in accord with the present invention in its minimal form.

With reference to FIG. 18, an exemplary projection system in accord with the present invention in its minimal form consists of the following components: a projector 121; a camera 123, which can be a digital still camera or a video camera; curved mirror 125, which can be spherical or otherwise; and mounting mechanisms for the above components. Light from projector 121 is reflected off curved mirror 125 before reaching a display surface 127, which can be any surface, including building walls, floors, ceilings, and dedicated projection screens. Display surface 128 can also be arbitrarily shaped. Reflecting the projected light off the curved mirror enlarges the projector FOV. Light rays from the environment, which may or may not have originated from the projector, also reflect off the curved mirror 125 before reaching the camera. This similarly enlarges the camera FOV.

Figure 19:
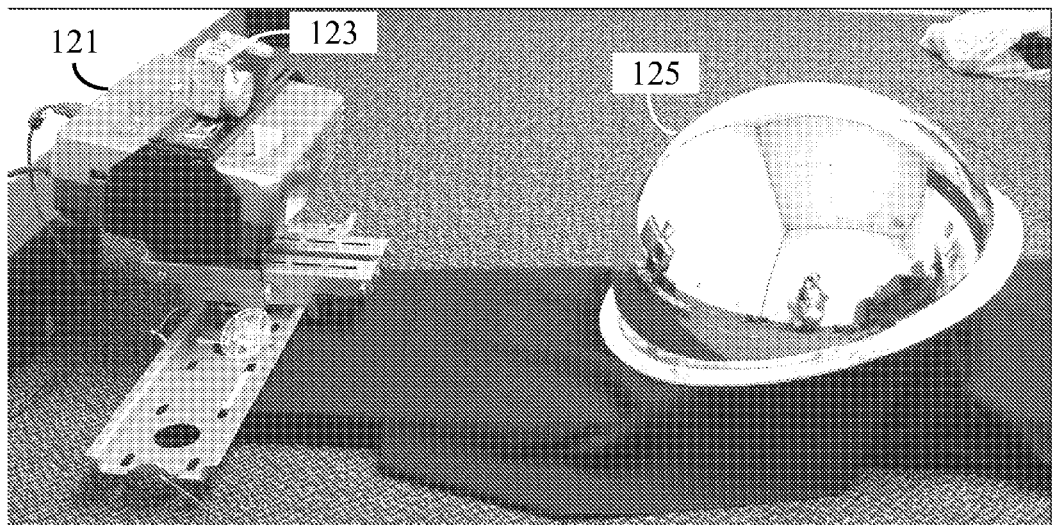
FIG. 19 shows a prototype based on the design of FIG. 18.
Figure 20:
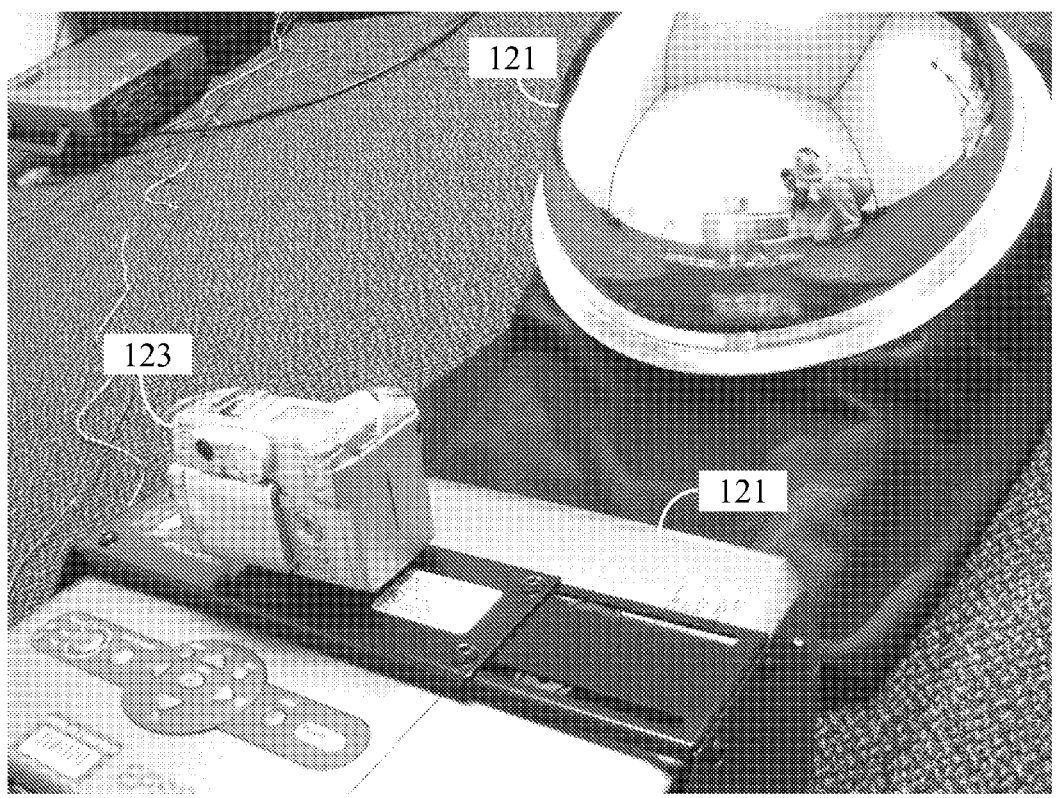
FIG. 20 is an alternate view of the setup of FIG. 19.

FIG. 19 shows a prototype based on the design of FIG. 18, and all elements in FIG. 19 similar to those of FIG. 18 have similar reference characters and are described above. In this prototype, curved mirror 125 is hemispherical, and camera 123 is a high resolution digital still camera. FIG. 20 is an alternate view of the setup of FIG. 19, shows the view of mirror 123 as seen (very roughly) from camera 123. As can be seen in FIG. 20, camera 123 is able to see the floor, at least three vertical walls, and the ceiling from the reflection in mirror 125.

Figure 21A:
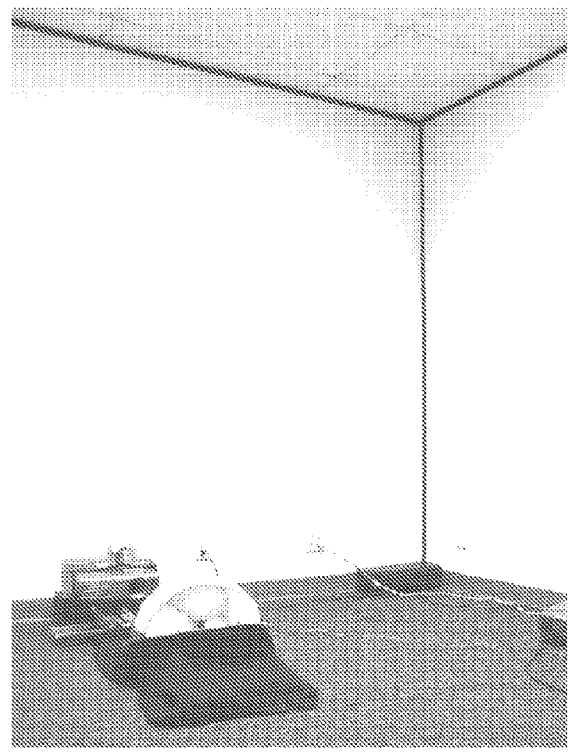
FIG. 21A shows, under ambient lighting, a room with the projection system of FIGS. 19 and 20 installed.
Figure 21B:
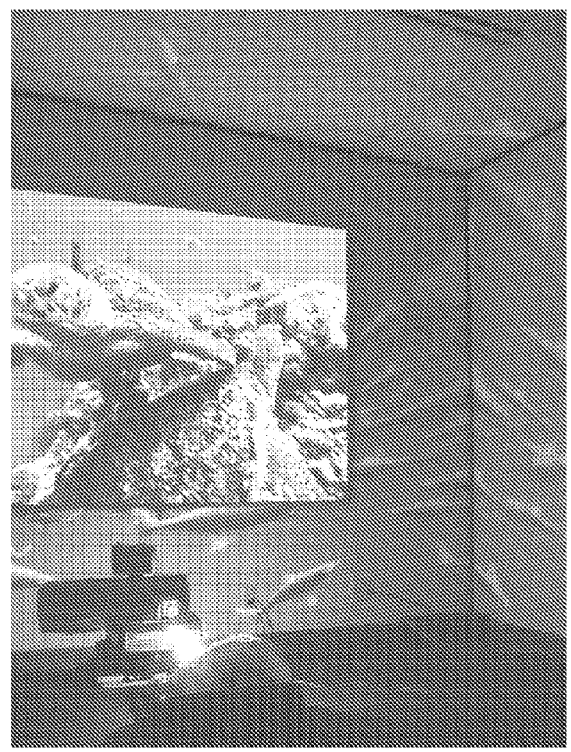
FIG. 21B shows the room of FIG. 21A under immersive projection lighting.

In FIG. 21A a room with the present projection system installed is shown under ambient lighting, and the same room is shown in FIG. 21B under immersive projection lighting from the present projection system. As can be seen, the present projection system is able to project images onto the two walls as well as the ceiling.

In the present embodiment, the FOV of projector 12 and the FOV of camera 123 are in general different, and may or may not overlap. When there is a significant overlap in the two FOV's, images captured by camera 123 can be used as feedback for improving the quality of a projected image from projector 121 in a manner similar to those described above. For example, feedback from to projector 121 can be used to compensate for variations in the display surface reflectance properties and shape so that the projected image appears as though it was projected on a flat white surface.

The FOV of camera 123 camera may also include areas not covered by the FOV of projector 121. For example, while projector 121 covers the front and side walls of the test room shown in FIGS. 21A and 21B, the camera may capture areas outside the projector FOV, possibly including areas where viewers are located. This allows the system to adapt and interact with viewers either by detecting and tracking the viewers or pointing devices. It may be possible for camera 123 to track small lights mounted, for example, on remote controls and facilitate user interaction.

In several of the designs described above, the projector and cameras do not have common optical centers. However it is possible to design projector-camera pairs with collocated optical centers. While a system with collocated optical centers allows the projector and the camera to have perfectly identical FOV, a system with non-collocated optical centers have the potential to allow 3D reconstruction of its environment.

Figure 22:
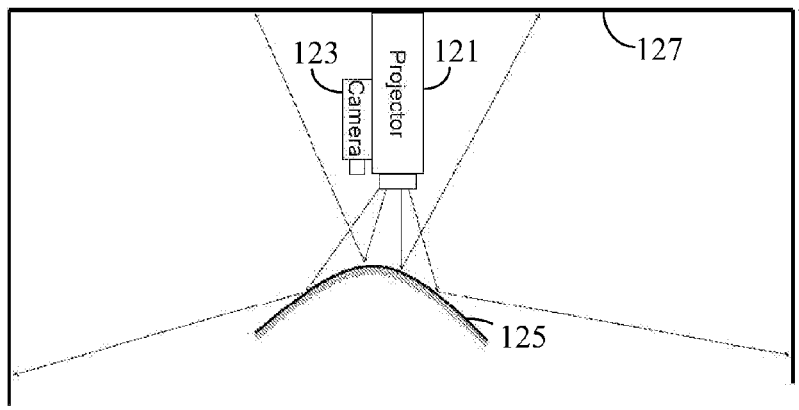
FIG. 22 is an alternative design for ceiling-mounted operation.

With reference to FIG. 22, an alternative design for ceiling-mounted operation is shown. All elements similar to those of FIG. 18 have similar reference characters and are described above.

Figure 23:
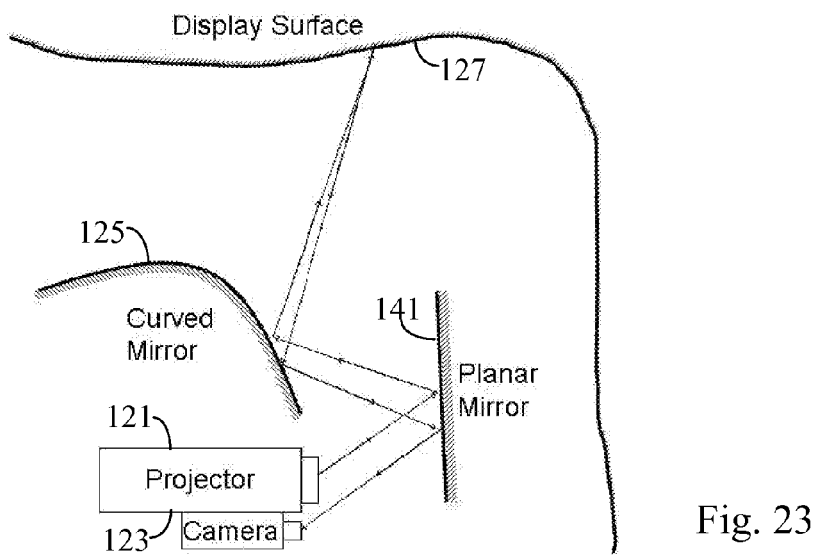
FIG. 23 is an alternate configurations of the present invention.
Figure 24:
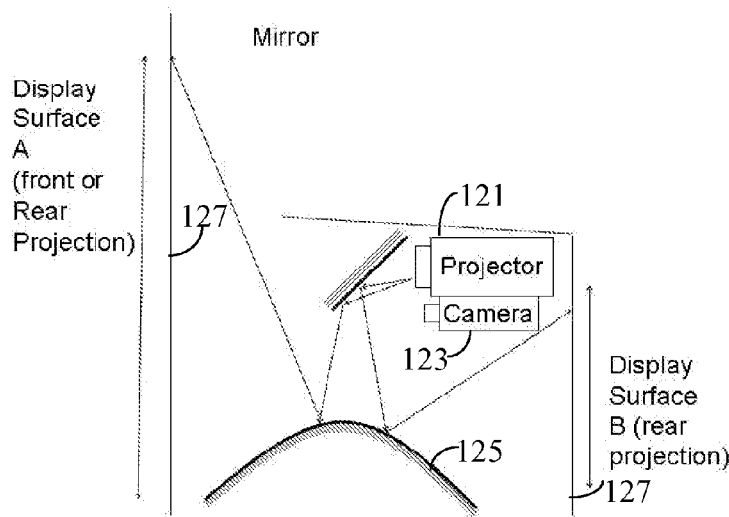
FIG. 24 is still another configuration of the present invention.

In FIGS. 23 and 24, two additional alternate configurations are shown. All elements in FIGS. 23 and 24 similar to those of FIG. 18 have similar reference characters and are described above. In FIG. 23 a planar mirror 141 is used to fold the optical path so that projector 121 and camera 123 can be placed under the curved mirror 125, thereby achieving a smaller footprint. FIG. 24 shows a booth design for enclosing projector 121, camera 123, curved mirror 125, and flat mirror 141 within a booth 143 for display booth operation.

Figure 25A:
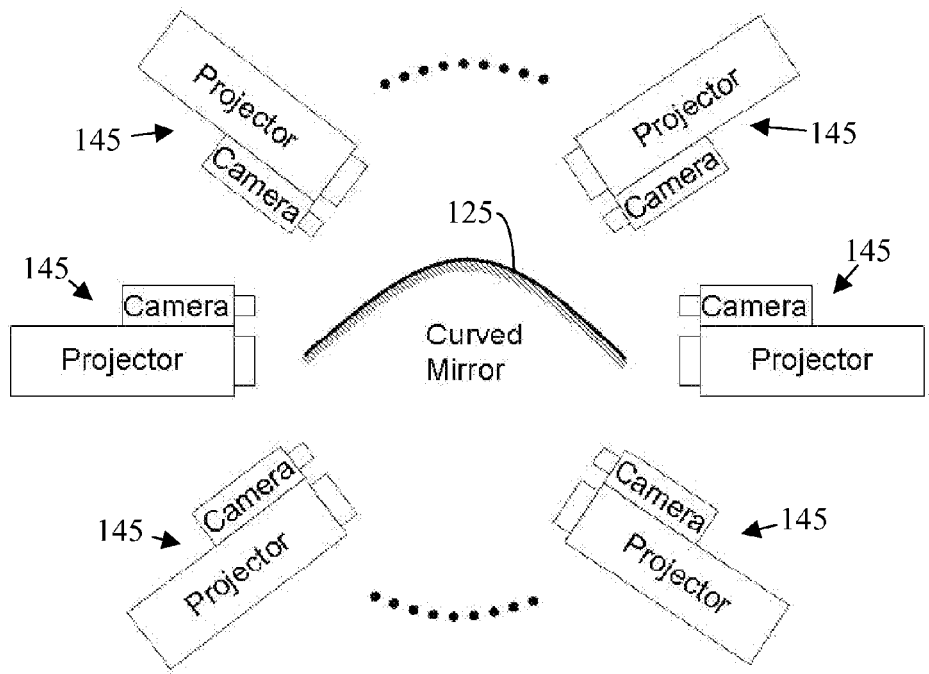
FIG. 25A shows a design that uses a single curved mirror 125 and multiple projector-camera pairs 145.
Figure 25B:
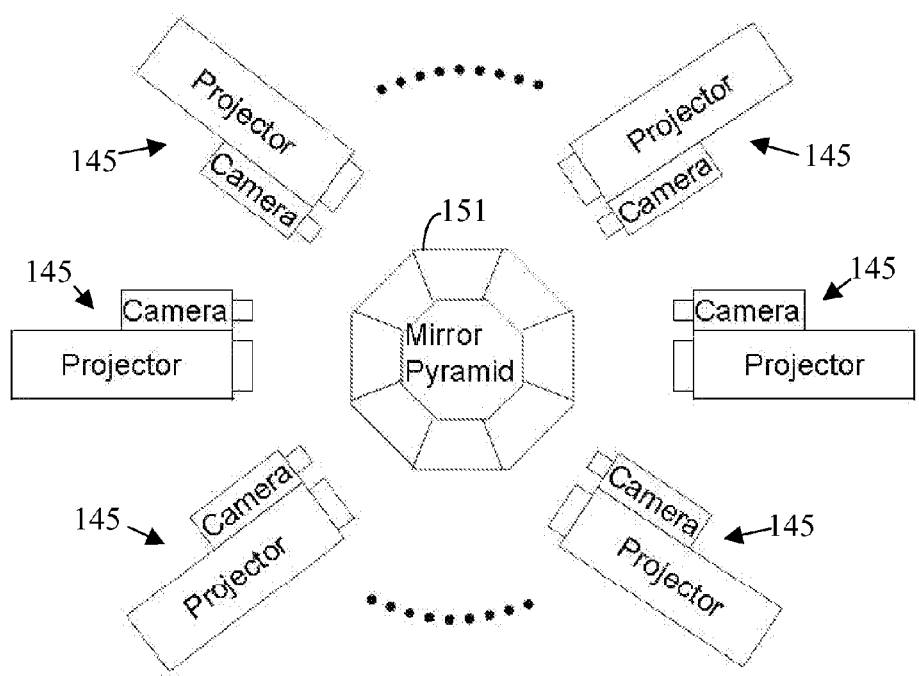
FIG. 25B shows a design that uses a single mirror pyramid 151 and multiple projector-camera pairs 145.

Two additional variations on the present design are further shown in FIGS. 25A and 25B. FIG. 25A shows a design that uses a single curved mirror 125 and multiple projector-camera pairs 145. FIG. 25B shows a design that uses a single mirror pyramid 151 and multiple projector-camera pairs 145. With the latter, the optical centers of all projectors can be collocated within the mirror pyramid, creating a single virtual large FOV projector. Similarly, the camera optical centers can also be collocated to create a single virtual large FOV camera.

Figure 26:
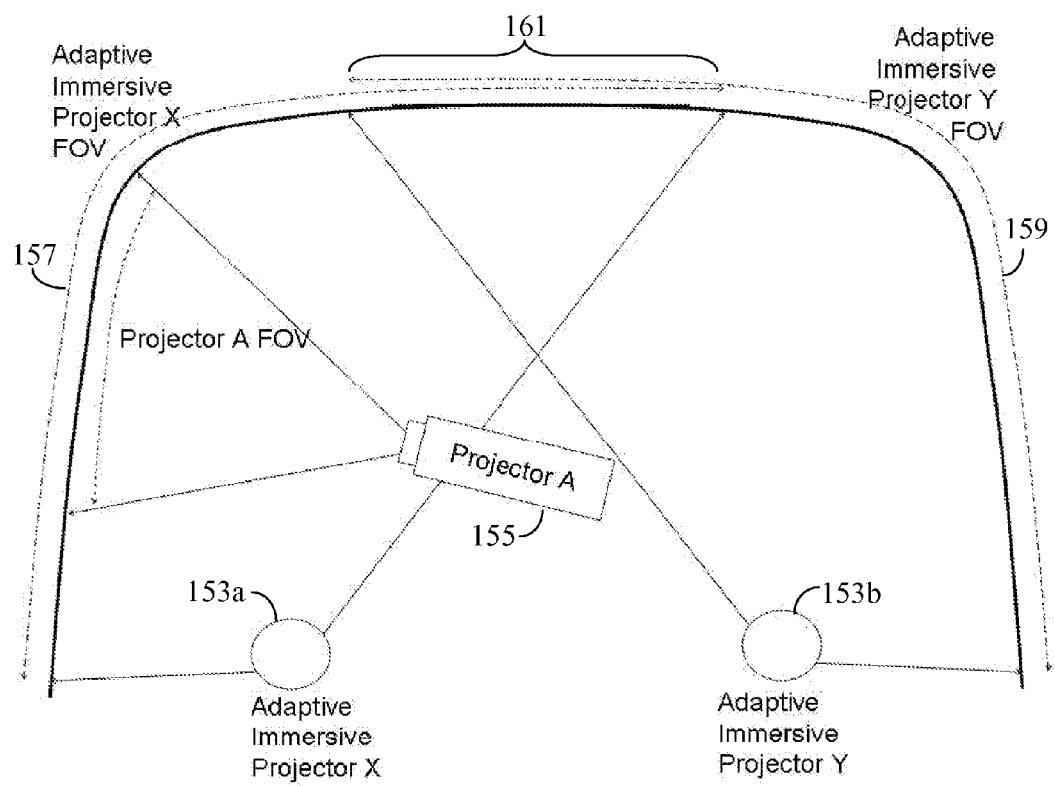
FIG. 26 shows how multiple large FOV projectors 153a and 153b can be used to achieve an even larger overall projection FOV.

Finally, FIG. 26 shows that multiple large FOV projectors 153a and 153b can be used to achieve an even larger overall projection FOV. One or more conventional projectors 155 can also be used in combination. As seen, the FOV of projector 153a, as indicated by dotted line 157 overlaps the FOV of projector 154b, as indicated by dotted line 159, by an overlap amount 161.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

What is claimed is:

1. A method of simulating a first projection of a first digital image from a first projector using a second projection of a second digital image from a second projector, comprising the following steps:
   (a) determining a first light transport matrix $T_1$ relating said first projector to a camera;
   (b) determining a second light transport matrix $T_2$ relating said second projector to said camera;
   (c) defining said second digital image as $(T_2^{-1})(T_1)$ multiplied by said first digital image.

2. The method of claim 1, wherein:
   said first light transport matrix $T_1$ relates a first projected image $p_1$ from said first projector to a first captured image $c_1$ captured by said camera by the following relationship $c_1 = T_1 p_1$;
   said second light transport matrix $T_2$ relates a second projected image $p_2$ from said second projector to a second captured image $c_2$ captured by said camera by the following relationship $c_2 = T_2 p_2$.

3. The method of claim 2, wherein said first projection is $p_1$ and said second projection is $p_2$.

4. The method of claim 1, further comprising:
   defining a first field-of-vision from said first projector;
   defining a second field-of-vision from said second projector that overlaps said first field-of-vision;
   arranging said camera to have a third field-of-vision that overlaps said first field-of-vision and said second field-of-vision.

5. The method of claim 4, wherein:
   said first field-of-vision is a subset of said second field-of-vision; and
   said third field-of-vision is a superset of said first field-of-vision and a subset of said second field-of-vision.

6. The method of claim 1, wherein said first projector is a front projector and said second projector is an immersive projector.

7. The method of claim 1, wherein $T_2^{-1}$, i.e., the inverse of said second light transport matrix $T_2$, is obtained by:
   identifying in turn each column in said second light transport matrix $T_2$ as target column, calculating normalized values for selected entry values in said target column with reference to said target column;
   creating an intermediate matrix of equal size as said second light transport matrix $T_2$;
   populating each column in said intermediate matrix with the calculated normalized values of its corresponding target column in said second light transport matrix $T_2$, each normalized value in each populated column in said intermediate matrix maintaining a one-to-one correspondence with said selected entry values in its corresponding column in said second light transport matrix $T_2$;
   defining $T_2^{-1}$ as the transpose of said intermediate matrix.

8. The method of claim 7, wherein value entries in said intermediate matrix not populated with a normalized value from a selected entry value in a corresponding target column in said second light transport matrix $T_2$ are populated with a zero value.

9. The method of claim 7, wherein only entry values greater than a predefined minimum value in each target column are selected for calculating their normalized value.

10. The method of claim 7, wherein the process of calculating normalized values for selected entry values in said target column with reference to said target column consists of generating a sum of the squares of only said selected entry values in said target column and disregarding all unselected values in said target column, and dividing each selected entry value by said sum.

11. The method of claim 7, wherein if said second light transport matrix $T_2$ is denoted as T, said intermediate matrix is denoted as $\check{T}$, a target column in T is denoted as Tr and a corresponding column in $\check{T}$ is denoted as $\check{T}r$, then the construction and population of $\check{T}$ is defined as $\check{T}r = Tr/(\|Tr\|)^2$.

12. The method of claim 7, wherein only non-zero entry values in each target column are selected for calculating their normalized value.

13. The method of claim 1, wherein in step (c), said second digital image is further defined as $(T_2^{-1})(T_1)$ multiplied by said first digital image or as $(T_2^{-1})(T_1)$ multiplied by a copy of said first digital image.

* * * * *